United States Patent
Kim et al.

(10) Patent No.: US 11,886,717 B2
(45) Date of Patent: Jan. 30, 2024

(54) INTERFACE FOR REVISION-LIMITED MEMORY

(71) Applicant: Google LLC, Mountain View, CA (US)

(72) Inventors: Eunchan Kim, San Jose, CA (US); Michael Stefano Fritz Schaffner, Campbell, CA (US); Timothy Jay Chen, Pleasanton, CA (US); Christopher Gori, San Francisco, CA (US); Ziv Hershman, Givat Schmuel (IL); Miguel Angel Osorio, El Dorado Hills, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/056,813

(22) Filed: Nov. 18, 2022

(65) Prior Publication Data

US 2023/0099564 A1  Mar. 30, 2023

Related U.S. Application Data

(63) Continuation of application No. 17/176,447, filed on Feb. 16, 2021, now Pat. No. 11,528,126.

(51) Int. Cl.
*G06F 3/06* (2006.01)
*H04L 9/06* (2006.01)
(Continued)

(52) U.S. Cl.
CPC ............ *G06F 3/0622* (2013.01); *G06F 1/10* (2013.01); *G06F 3/0656* (2013.01); *G06F 3/0659* (2013.01); *G06F 3/0673* (2013.01); *G11C 29/38* (2013.01); *G11C 29/44* (2013.01); *H04L 9/0618* (2013.01); *H04L 9/0869* (2013.01); *H04L 2209/16* (2013.01)

(58) Field of Classification Search
CPC .... G06F 3/0673; G06F 3/0622; G06F 3/0656; G06F 3/0659; G06F 3/0637; G11C 29/38; G11C 29/44
See application file for complete search history.

(56) References Cited

U.S. PATENT DOCUMENTS 6,631,086 B1  10/2003  Bill et al.
8,255,655 B2   8/2012  Yu et al.
(Continued)

FOREIGN PATENT DOCUMENTS

CN  106295414  1/2017
CN  106778205  5/2017

OTHER PUBLICATIONS

"Non-Final Office Action", U.S. Appl. No. 17/176,447, dated Mar. 15, 2022, 9 pages.
(Continued)

*Primary Examiner* — Shelly A Chase
(74) *Attorney, Agent, or Firm* — Colby Nipper PLLC

(57) ABSTRACT

This document includes techniques, apparatuses, and systems related to an interface for revision-limited memory, which can improve various computing aspects and performance. In aspects, confidentiality, integrity, and availability may be ensured while increasing the performance of revision-limited memory. In this example, the techniques also enable the digital computing device to interact with information related to the revision-limited memory.

20 Claims, 10 Drawing Sheets

(51) Int. Cl.
    *G11C 29/38*     (2006.01)
    *G11C 29/44*     (2006.01)
    *H04L 9/08*     (2006.01)
    *G06F 1/10*     (2006.01)

(56) References Cited

U.S. PATENT DOCUMENTS

| | | |
|---|---|---|
| 8,547,724 B2 | 10/2013 | Lee et al. |
| 11,528,126 B2 | 12/2022 | Kim et al. |
| 2007/0180165 A1* | 8/2007 | Chao .................. G06F 21/57 710/62 |
| 2008/0025118 A1* | 1/2008 | Scheuerlein ....... G11C 13/0069 365/201 |
| 2012/0092916 A1 | 4/2012 | Lee et al. |
| 2020/0202972 A1 | 6/2020 | Denorme et al. |
| 2020/0244458 A1* | 7/2020 | Kanbe .................. G06F 3/0637 |
| 2022/0263646 A1 | 8/2022 | Kim et al. |

OTHER PUBLICATIONS

"Notice of Allowance", U.S. Appl. No. 17/176,447, dated Jul. 27, 2022, 5 pages.

Hassan, et al., "SoftMC: A Flexible and Practical Open-Source Infrastructure for Enabling Experimental DRAM Studies", 2017 IEEE International Symposium on High Performance Computer Architecture (HPCA), 12 pages.

\* cited by examiner

INTERFACE FOR REVISION-LIMITED MEMORY

CROSS-REFERENCE TO RELATED APPLICATION(S)

This application is a continuation of and claims priority to U.S. patent application Ser. No. 17/176,447, filed Feb. 16, 2021, the entire disclosure of which is hereby incorporated by reference.

BACKGROUND

Digital computing devices often include various integrated circuits and other circuitry. Data are often stored on portions of the circuitry for booting and other low-level, hardware-oriented tasks. Even the best-protected data stored on the circuitry can be manipulated. Because of this, revision-limited memory may be used to prevent alteration of the data. As an example, revision-limited memory may prevent bits stored therein from changing more than a predetermined number of times or prevent rewriting bits after a command is received. Due to the effectiveness of revision-limited memory, many implementations and circuit configurations are commonly used to ensure written data is the same when the digital computing devices are turned on or when the data is accessed. Such memory is often specifically designed for the implementation at hand. These specific designs, however, burden integrators attempting to combine the memory with the digital computing device.

SUMMARY

This document includes techniques, apparatuses, and systems related to an interface for revision-limited memory, which can improve various computing aspects and performance. In aspects, confidentiality, integrity, and availability may be ensured while increasing the performance of revision-limited memory. In this example, the techniques also enable the digital computing device to interact with information related to the revision-limited memory.

The techniques, apparatuses, and systems may use an interface to interact with information related to the revision-limited memory. By doing so, the techniques, apparatuses, and systems allow for interaction with revision-limited memory with increased efficiency and speed and a reduction in redundant operations. For example, a method is described that translates a generic command indicative of an operation associated with revision-limited memory to an access port command indicative of the operation for the revision-limited memory. The method is also described as sending the access port command to the revision-limited memory instructing to execute the operation. The method also comprises receiving an output based on the access port command.

Optional features of one aspect, such as the method described above, may be combined in whole or in part with other aspects.

This summary is provided to introduce simplified concepts concerning interfaces for revision-limited memories, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of providing interaction with revision-limited memory are described in this document with reference to the following drawings. The same numbers are used throughout the drawings to reference like features and components.

DETAILED DESCRIPTION

Overview

Figure 1:
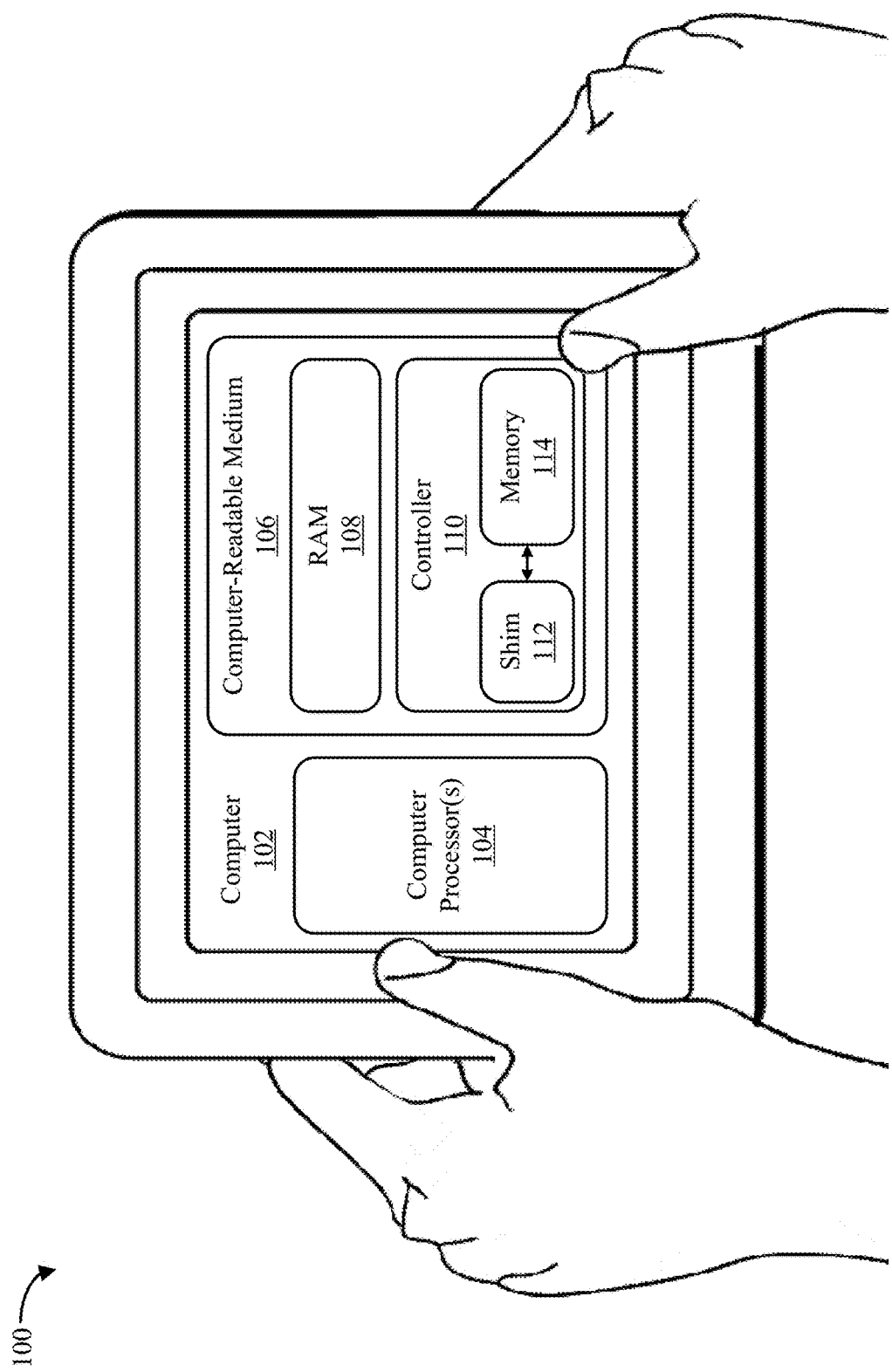
FIG. 1 illustrates an example environment in which techniques enabling interfaces for revision-limited memory can be implemented in accordance with one or more implementations of the present disclosure.

An example computer includes various integrated circuits and hardware components mounted to a motherboard or other printed circuit board. The integrated circuits and hardware components interconnect to communicate and interact with one another. Communication and interaction between the components may establish trust based on cryptographic mechanisms.

Assume that the computer includes revision-limited memory. The revision-limited memory may be any number of memory arrays or circuitries. As examples, the revision-limited memory is a write-once memory or one-time-programmable memory. The revision-limited memory may limit revisions to data stored therein through logical or physical mechanisms. The computer or revision-limited memory may operate according to stages that define the state of the computer or revision-limited memory. As a limited set of examples, the revision-limited memory may be programmed with configuration details, secret keys, and tokens. After the configuration details, secret keys, and tokens are programmed a predetermined number of times, the revision-limited memory is then locked to prevent changes to the configuration details, secret keys, and tokens. As an example, on a first write, the revision-limited memory may be locked to ensure the configuration details, secret keys, tokens, or other information stored therein is not altered.

The revision-limited memory may be application specific. In developing implementations for the computer, integrators may be required to specifically tailor the computer and related hardware to the revision-limited memory. As an example, revision-limited memory can require orders-of-operation, specific communication protocols, built-in self-test mechanisms, bit redundancies, handshakes, timings, frequencies, power sequencing, other specificities, or any combination thereof. To integrate the revision-limited memory with a computer, system integrators are required to make adjustments to the computer and interfaces related to the revision-limited memory.

Consider an example integration with the revision-limited memory. A shim, also referred to as an application programming interface, translator, or wrapper may be used to communicate with the revision-limited memory. As an example, the shim may communicate over a TILELINK protocol (e.g., UNCACHED LIGHTWEIGHT) with a controller or the revision-limited memory, which is also known as TL-UL. As an example, the revision-limited memory includes one or more interfaces, for example, a first interface and a second interface. The interfaces may communicate serially or in parallel. The first interface is intended for test and programming operations, and the latter is intended to be used for reading out data from the revision-limited memory. The shim may include logic and circuitry for communicating with the first interface and the second interface with commands and operations that are specific to the revision-limited memory. The shim may include logic and circuitry for communicating with various types of revision-limited memory and various types of computers and interfaces. As an example, the shim may include individual interfaces or connection points for an arbitrary number of revision-limited memory interfaces (e.g., two). As an example, the shim may employ lookup tables or instruction mapping to translate commands with the logic and circuitry. The shim may include one or more individual interfaces for the computer to allow access to revision-limited memory interfaces. As an example, the interfaces may include various pins for digital or discrete communications. For instance, a ready pin or a valid pin may be implemented to indicate to the computer that the revision-limited memory is ready or that information retrieved from the revision-limited memory is complete, regardless of the type or implement of revision-limited memory used.

The shim may also improve the efficiency of the computer when revision-limited memory is used. As an example, the shim can be implemented to, for example, reduce access requests to the revision-limited memory, reduce write requests of the revision-limited memory, and organize traffic between the computer and the revision-limited memory.

As an example taught by this disclosure, the shim may be deployed entirely in hardware, using a combination of circuits and logic to translate incoming commands to the respective first interface and second interface instructions necessary to communicate with the revision-limited memory. The shim provides an interface that improves the processing of the computer and the accessing of stored information on the revision-limited memory.

Such a computer and shim may be hardened against attack vectors as taught by this disclosure. As an example, interaction access with the revision-limited memory may be implemented in hardware by a controller. The controller may interact with the shim and the revision-limited memory in unique ways to ensure security of the computer is maintained. Buffers may be used to maintain information retrieved from the revision-limited array.

Operating Environment

In FIG. 1, an example environment 100 in which techniques enabling interfaces for revision-limited memory 114 can be implemented in accordance with one or more implementations of the present disclosure. The computer 102 may include additional components and interfaces omitted from FIG. 1 for the sake of clarity, and the computer 102 can be a variety of electronic devices or user devices. As one non-limiting example, the computer 102 includes one or more computer processors 104. The processors 104 are configured to interface with the computer-readable medium 106. The computer-readable medium 106 may be any type or combination of types and may include random-access memory (RAM) 108 for performing computer-based tasks with the processors 104. The computer-readable medium 106 also includes a controller 110 for interacting with the shim 112 and revision-limited memory 114. The controller 110 may be integrated with the computer-readable medium 106 or distinct from the computer-readable medium 106 and disposed elsewhere on the computer 102. The controller 110 may be a combination of circuitry, memory, and logic that includes processors and other processing circuitry to access the revision-limited memory 114 and registers accessible by the computer 102. The controller 110 may include any type of memory (e.g., random-access memory (RAM), static RAM (SRAM), dynamic RAM (DRAM), non-volatile RAM (NVRAM), read-only memory (ROM), Flash memory) to store data and instructions for operation. The instructions can include an operating system 202, one or more application 200, and system settings 204. The data can include instructions in computer-readable form. For instance, a program defining instructions operable to implement the teachings of this disclosure. The instructions may be of any implement and may include field-programmable gate arrays (FPGA), machine code, assembly code, higher-order code (e.g., RUBY), or various combinations thereof. The processor 104 or a controller processor may execute the instructions to follow a combination of steps and executions as provided in this disclosure.

Figure 2:
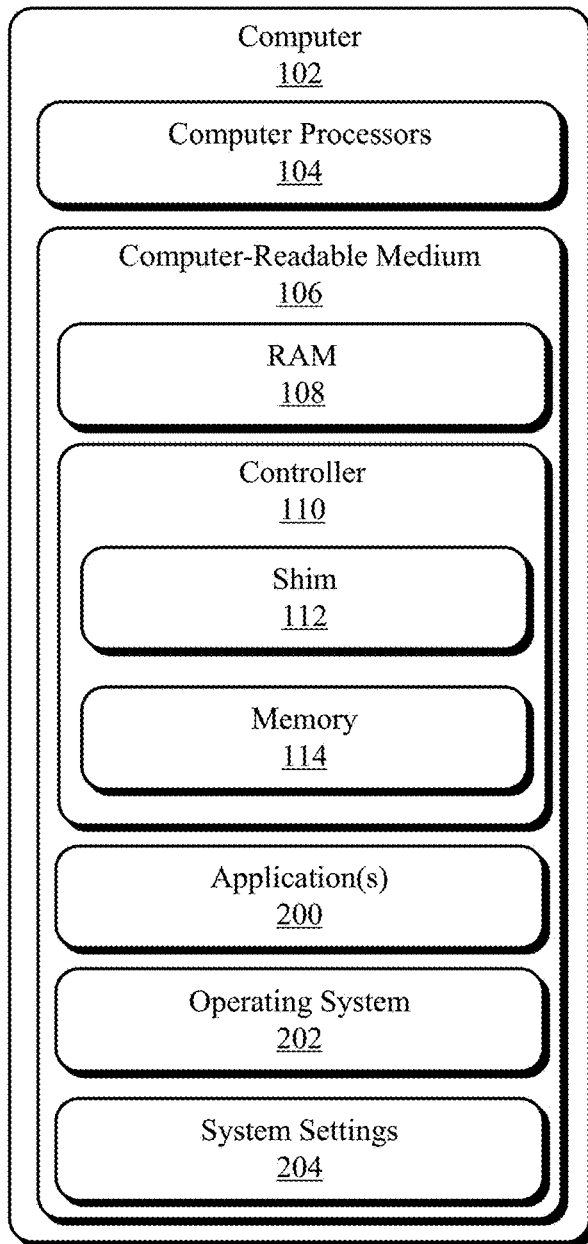
FIG. 2 illustrates an example computer in accordance with one or more implementations of the present disclosure.
Figure 2:
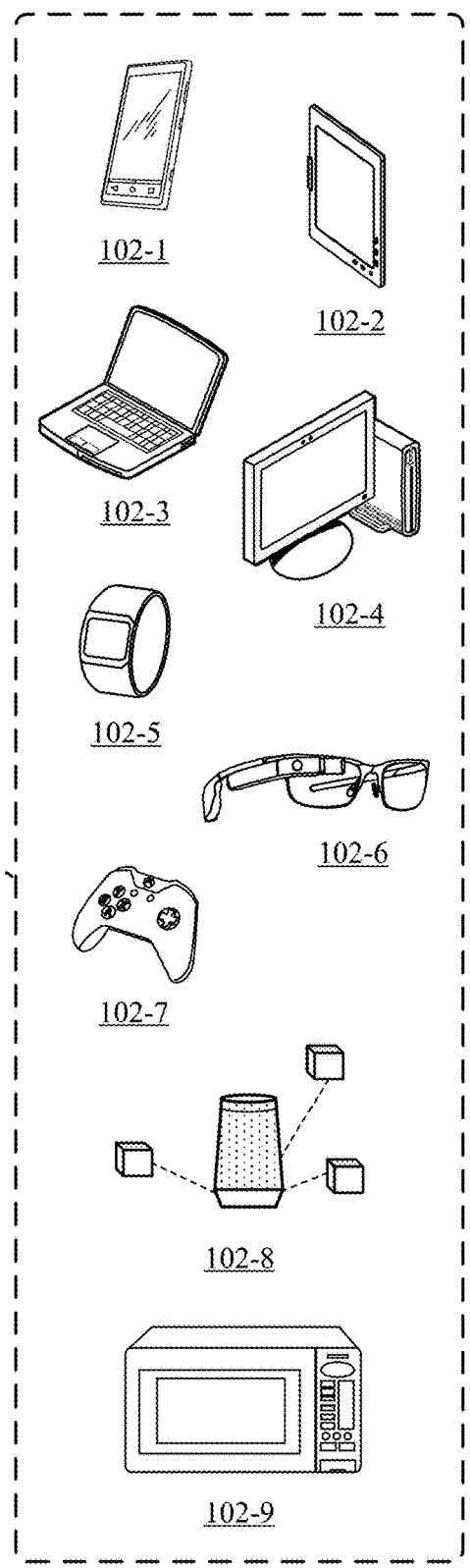

Consider FIG. 2, where an example computer 102 in accordance with one or more implementations of the present disclosure is shown. The computer 102 of FIG. 2 is illustrated with a variety of example devices, including a smartphone 102-1, a tablet 102 2, a laptop 102-3, a desktop computer 102-4, a computing watch 102-5, computing spectacles 102-6, a gaming system 102-7, a home automation and control system 102-8, and a microwave 102-9. The computer 102 can also include other devices, e.g., televisions, entertainment systems, audio systems, automobiles, drones, track pads, drawing pads, netbooks, e-readers, home security systems, other home appliances, and other internet of things devices. Note that the computer 102 can be mobile, wearable, non-wearable but mobile, or relatively immobile (e.g., desktops appliances, and servers in datacenters). Any type of computing device is contemplated by this disclosure.

The computer 102 also includes one or more computer processors 104 and one or more computer-readable media 106, which include RAM 108, a controller 110 associated with a shim 112, and a revision-limited memory 114. Applications 200 and/or the operating system 202 implemented as computer-readable instructions on the computer-readable medium 106 can be executed by the computer processors 104.

The computer 102 may also include a network interface. The computer 102 can use the network interface for communicating data over wired, wireless, or optical networks. By way of example and not limitation, the network interface may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof.

Figure 3:
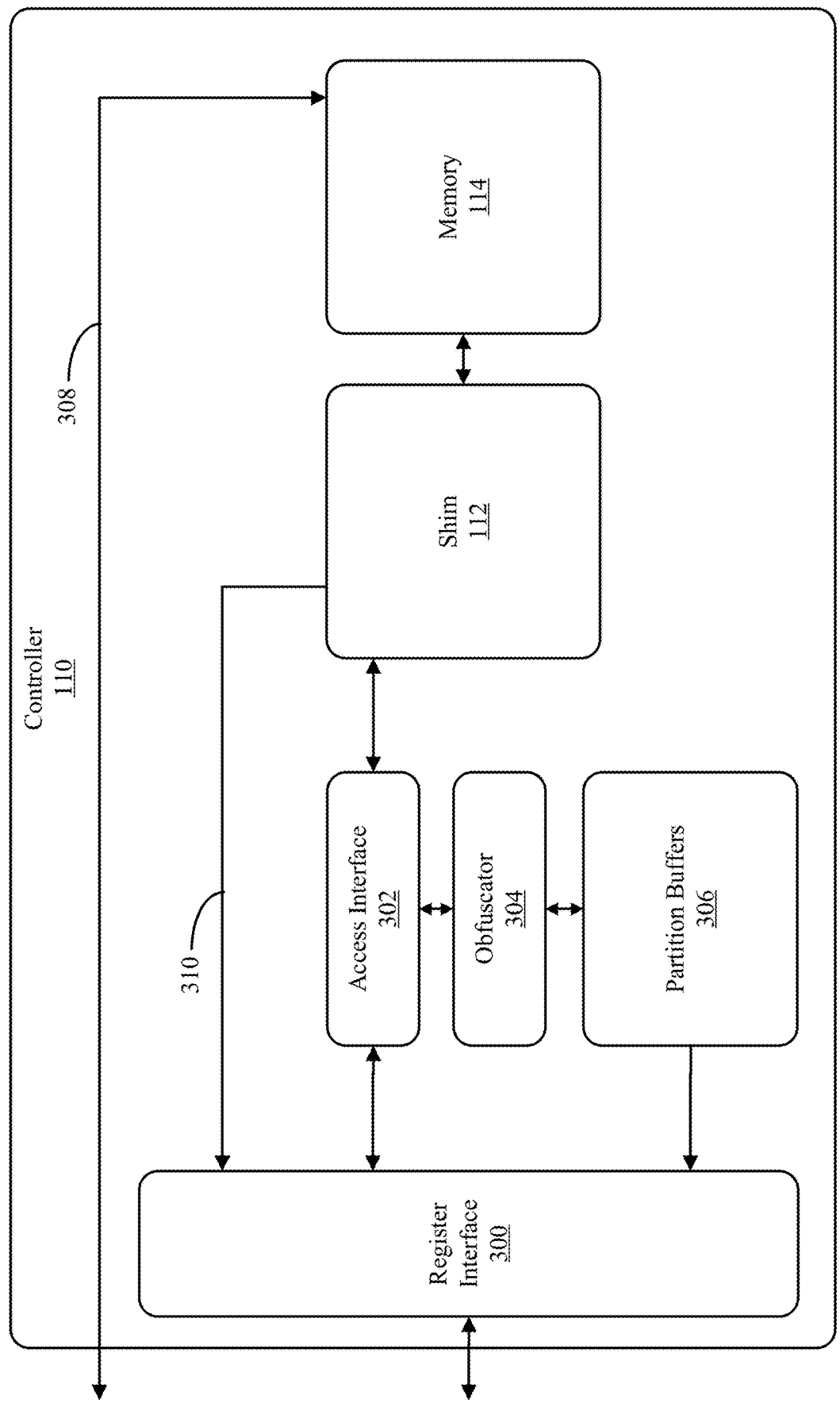
FIG. 3 illustrates an example controller in accordance with one or more implementations of the present disclosure.

Continuing with FIG. 3, an example controller 110 in accordance with one or more implementations of the present disclosure is shown. The controller 110 may be various implementations of circuitry and logic. As an example, the controller 110 may include a register interface 300 for communicating with the RAM 108 and processors 104, providing a linear address space of predetermined-bit words (e.g., 32). As an example, the register interface 300 may be a register of the processors 104 or connected with other integrated circuitry. The register interface 300 may provide access to data stored on the revision-limited memory 114. The register interface 300 may also provide access to a TILELINK UNCACHED LIGHTWEIGHT window on the shim 112. As information is received by the register interface 300, the information may be communicated to an access interface 302, controlling the transfer of information between the register interface 300 and the shim 112. In the example, the access interface 302 is associated with the obfuscator 304. The obfuscator 304 can be implemented to scramble, descramble, encrypt, decrypt, obfuscate, deobfuscate, or various combinations thereof, data sent between the shim 112, revision-limited memory 114, the partition buffers 306, and the register interface 300. The obfuscator 304 may be used to generate or otherwise process encryption keys stored on the revision-limited memory 114. As shown, the shim 112 may provide power sequencing signals 308 in various power domains, including in the VDD domain (e.g., drain voltage) and the VCC domain (e.g., collector voltage), that are associated with analog sensors with respect to ground or another reference. The revision-limited memory 114 may further respond with power sequencing signals to indicate it has successfully initialized. During particular states of the life cycle, the shim 112 may provide a TL-UL window 310 to give particular insight into the activities of the shim and the revision-limited memory 114.

Figure 4:
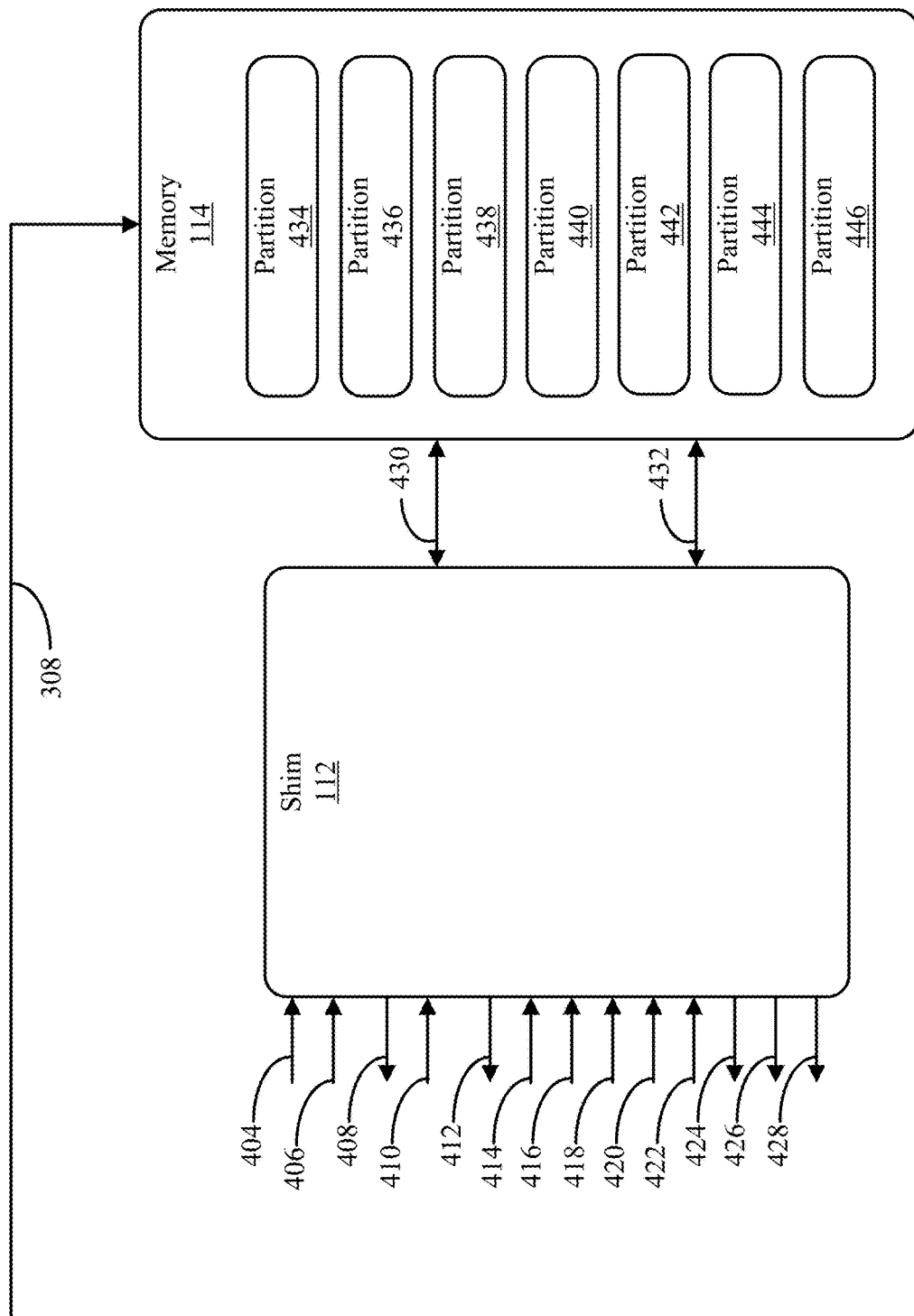
FIG. 4 illustrates an example interface in accordance with one or more implementations of the present disclosure.

In FIG. 4, an example shim 112 in accordance with one or more implementations of the present disclosure is shown. The revision-limited memory 114 defines partitions 434, 436, 438, 440, 442, 444, and 446. The partitions 434, 436, 438, 440, 442, 444, 446 may be logically isolated, physically isolated, virtually isolated, or various combinations thereof. Although shown as a specific number, the partitions 434, 436, 438, 440, 442, 444, 446 may be various quantities. The partitions 434, 436, 438, 440, 442, 444, 446 may be assigned memory addresses.

As an example, partition 434 is reserved for software configuration information specific to the computer 102. As an example, the computer 102 may be calibrated during manufacture, and this information may be stored in the revision-limited memory 114 in partition 434. The software configuration information may be related to clock information (e.g., frequency), low-dropout regulator values, random-number generator values, device identity values (e.g., universally unique ID, serial number), or other information.

As another example, partition 436 is reserved for owner configuration information specific to an owner or designee of the computer 102. For instance, the computer 102 may be assigned to other owners for the purposes of firmware or software ownership, or other reasons, keys related to this exchange may be stored in partition 436. Partition 438 is reserved for hardware configuration information. The hardware configuration information may include the raw entropy (e.g., randomness) of hardware associated with portions of the computer 102 or the controller 110 and FLASH obfuscating bypass ranges. The hardware configuration information may also include configuration bits that govern the behavior and parameterization of other hardware blocks in the system, e.g., the obfuscation bypass ranges in the Flash or specific debug features.

Continuing with example partition information, partition 440 is reserved for test unlock tokens, and partition 442 is reserved for SRAM and FLASH obfuscating key roots. That is, the partition 442 stores root keys that are used to derive keys used by the obfuscator 304. As an example, the obfuscator 304 may generate an obfuscating key based on the root keys stored in partition 442.

Lastly, in the example, partition 444 is reserved for storage of a return material authorization (RMA) unlock token and a creator root key, and partition 446 is for storing life-cycle information. The computer 102 may have distinct stages of production, from manufacturing to testing and issuance. Information may be written to partition 446 regarding the particular stages that have been completed and information related to those stages.

Various quantities of partitions 434, 436, 438, 440, 442, 444, 446 may be implemented on the revision-limited memory 114. Any of the partitions 434, 436, 438, 440, 442, 444, 446 enumerated may be duplicated or omitted, and the partitions 434, 436, 438, 440, 442, 444, 446 may be associated with various information specified above or unspecified.

The partitions 434, 436, 438, 440, 442, 444, 446 may be associated with the access interface 302 through memory mappings. In an example, the partitions 434, 436, 438, 440, 442, 444, 446 are associated with specific memory ranges of the revision-limited memory 114. It should be appreciated that 0x is intended to denote hexadecimally coded, digital information.

TABLE 1

Example Memory Allocation

| Partition | Item | Byte Address |
|---|---|---|
| Partition 434 | Content | 0x000 |
| | Digest | 0x2F8 |
| Partition 436 | Content | 0x300 |
| | Digest | 0x5F8 |
| Partition 438 | Computer 102 Identifier | 0x600 |
| | Content | 0x620 |
| | Digest | 0x6C8 |
| Partition 440 | Unlock Token | 0x6D0 |
| | Exit Token | 0x6E0 |
| | Digest | 0x6F0 |
| Partition 442 | Flash Address Key Seed | 0x6F8 |
| | Flash Data Key Seed | 0x718 |
| | SRAM Data Key Seed | 0x738 |
| | Digest | 0x748 |
| Partition 444 | RMA Token | 0x750 |
| | Root Key 0 | 0x760 |
| | Root Key 1 | 0x780 |
| | Digest | 0x7C0 |
| Partition 446 | Life Cycle State | 0x7C8 |
| | Transition Count | 0x7E0 |

Addresses associated with the partitions 434, 436, 438, 440, 442, 444, 446 are modifiable to accommodate memory provided by the revision-limited memory and the number of partitions 434, 436, 438, 440, 442, 444, 446 implemented. As shown, the content associated with the partitions 434, 436, 438, 440, 442, 444, 446 is also associated with a digest of the content stored within the respective memory allocation of the respective partition 434, 436, 438, 440, 442, 444, 446. The digest may be calculated in hardware by the controller 110. The digest may be calculated based on the amount of information in the respective partition 434, 436, 438, 440, 442, 444, 446. As an example, once the respective partition 434, 436, 438, 440, 442, 444, 446 is populated with indicated information, a digest calculation may be triggered by the access interface 302.

The shim 112 is shown conductively connected to the revision-limited memory 114 over first interface 430 and second interface 432, and revision-limited memories may include various interfaces to provide functions similar to first interface 430 and second interface 432 and other functions not specified. In the present example, the first interface 430 is related to test and programming operations associated with the revision-limited memory 114, and the second interface 432 is related to reading information from the revision-limited memory 114.

The shim 112 may receive a primary clock 404. The primary clock 404 may define the operating signal for hardware of the shim 112. The shim 112 may also receive a reset input 406. In an example, the shim 112 includes an output channel 408 and an input channel 410 related to the first interface 430. The input channel 410 and output channel 408 may directly connect with the first interface 430. A ready output 412 may be implemented to indicate that the shim 112 is ready for a command handshake. The ready output 412 may be paired with a valid input 414 to introduce backpressure or a hold indication if the revision-limited memory is unable to accept a new command based on current operations. As an example, the ready output 412 and the valid input 414 indicate when the input to the shim 112 is valid. As an example, if data received from the access interface 302 is completely sent to the shim 112, the valid bit line may go HIGH.

The size of data received by the shim 112 may need to be sliced or adjusted to meet size constraints associated with the partitions 434, 436, 438, 440, 442, 444, 446, the revision-limited memory 114, or a combination thereof. A size input 416 may indicate the size of the slices. As an example, the size input 416 may have two bits corresponding to the number of words native to the revision-limited memory 114, the obfuscator 304, the access interface 302, the partition buffers 306, or any combination thereof. That is, a "00" may correspond to a bit slice of one word, while an "11" may correspond to a bit slice of four words. Similarly, a command input 418 may designate the command type necessary for the revision-limited memory 114. As examples, the command input 418 may receive a "00" value signifying a read operation, an "01" value signifying a write operation, or an "11" value for an initialization operation.

The requisite address may be provided through the address input 420. As an example, the address input 420 may designate the memory location on the revision-limited memory 114 for the instant operation. The address input 420 may convey this information through a word. For instance, a write to one of the partitions 434, 436, 438, 440, 442, 444, 446 may be indicated by a partition label, indicator, memory location, or any combination thereof associated with the respective partition 434, 436, 438, 440, 442, 444, 446. For instance, the shim 112 may include circuitry for translating binary partition indications (e.g., "00" for partition 434) to memory locations defined in Table 1.

The write-data input 422 receives write data from the access interface 302 for writing to the revision-limited memory 114 as described herein. The write-data input 422 may include a register or another implement for retaining the write data received. As an example, the register may be sized according to the access interface 302, the obfuscator 304, other constraints related to controller 110, size input 416, or various combinations thereof. As an example, the access interface 302 may include various registers for interaction with the revision-limited memory 114. As an example, the access interface 302 may include one or more registers for write data. Write data may be transferred from the access interface 302 to the write-data input 422 and associated registers to ensure the correct data will be written to the revision-limited memory 114.

The shim 112 may also include a set of outputs related to the revision-limited memory 114. As an example, the shim 112 can include a valid output 424. Valid output 424 provides an indication that the entire read operation has been completed and that data in the read data output 426 is complete. The valid output 424 may be as simple as a high signal or a more-complicated digest of the read data output 426 or portion thereof. The error output 428 may be as simple as a high bit-value or a code associated with the current command input 418 or another parameter associated with the shim 112. As an example, if a write operation was unsuccessful, the error output 428 may provide an indication that one or more of the partitions 434, 436, 438, 440, 442, 444, 446 were unchanged. For instance, the error output 428 may indicate whether a recoverable error or unrecoverable error has occurred. If no error has occurred, the error output 428 may be 0x0. If the command input 418 received was invalid or did not successfully complete, the error output 428 may indicate 0x1.

Further, if an error correction code (ECC) type memory error has occurred (e.g., during a read operation), the error output 428 may be 0x2. Such indication can cause the shim 112 or the revision-limited memory 114 to perform specific operations based on the error output 428. As an example, an ECC error may cause operation of the revision-limited memory 114 to remedy the error as described herein or by another method. The error output 428 may further indicate that the ECC type memory error is not correctable, which may lead to a faulty product determination and a potential RMA. As a final example, the error output 428 may be 0x4, indicating that the write operation attempted to clear a bit that has already been written beyond the number of revisions allowed to the revision-limited memory 114. That is, if a particular memory location has already been write or revision-locked, attempts to rewrite or revise the memory location will return the error 0x4. As such, the shim 112 may query the revision-limited memory 114 regarding the status of the memory locations therein to determine whether bits have been written. The error output 428 may be determined by the shim 112 or present errors provided by the revision-limited memory 114. In addition, other example error values are contemplated by this disclosure.

Figure 5:
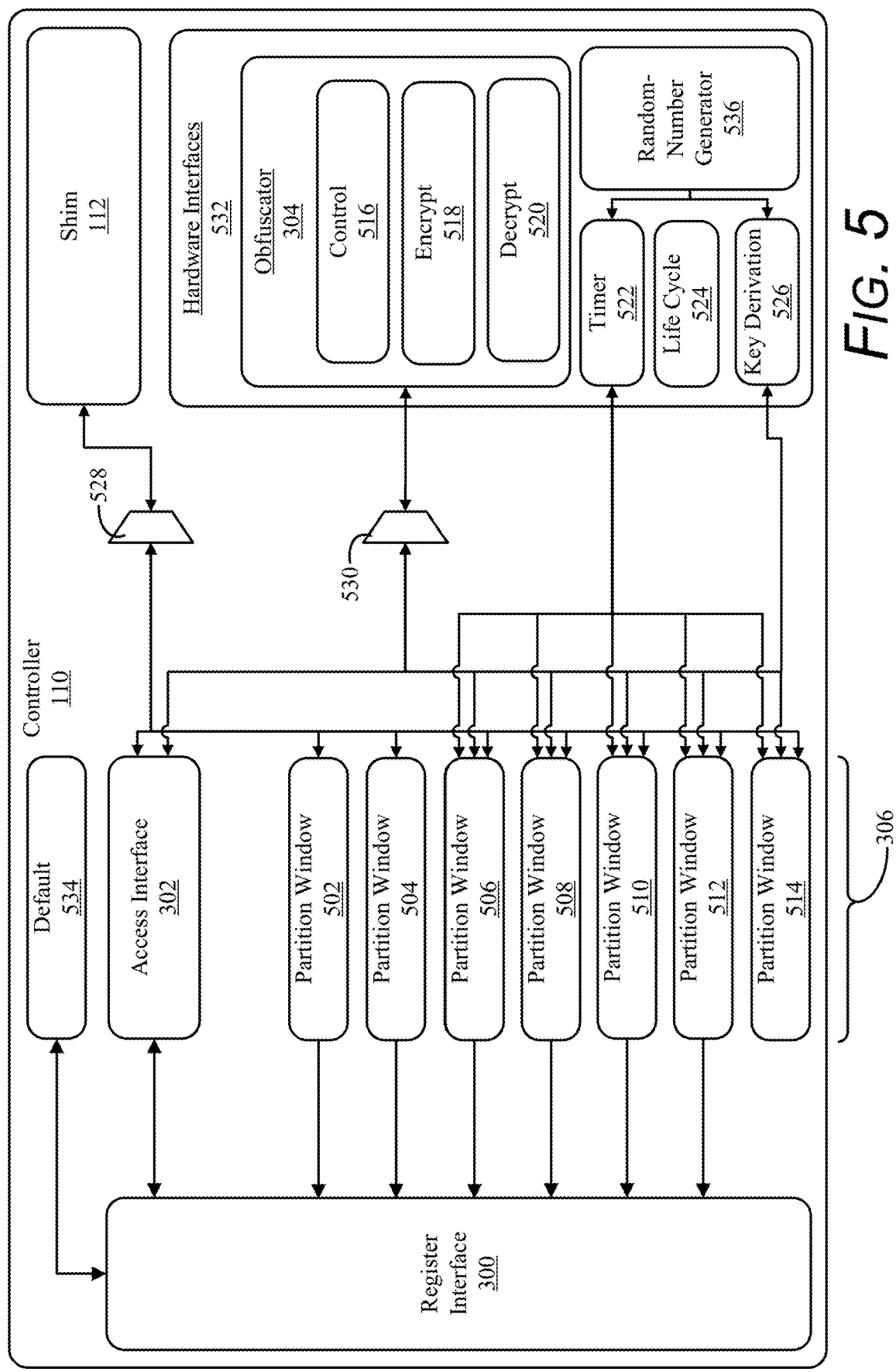
FIG. 5 illustrates another example of the controller in accordance with one or more implementations of the present disclosure.

Turning to FIG. 5, another example of the controller 110 in accordance with one or more implementations of the present disclosure is shown. The controller 110 includes access interface 302. In an example, the access interface 302 orchestrates information flow between the register interface 300, the shim 112, buffers, and the hardware interfaces 532. As an example, orchestration by the access interface 302 of the partitions 434, 436, 438, 440, 442, 444, 446 may be unique, independent, or specific to the partition 434, 436, 438, 440, 442, 444, 446 accessed or written. For instance, some of the partitions 434, 436, 438, 440, 442, 444, 446 may be directly connected, through the access interface 302 and shim 112, to the register interface 300 through partition windows 502, 504, 506, 508, 510, 512, 514. Other partitions 434, 436, 438, 440, 442, 444, 446 may be buffered through partition windows 502, 504, 506, 508, 510, 512, 514 according to a clock signal (not shown) and memory registers, along with other circuitry. The partition windows 502, 504, 506, 508, 510, 512, 514, or portions thereof, may be mapped using lookup tables, logic, other circuitry, and combinations thereof to the partitions 434, 436, 438, 440, 442, 444, 446. As an example, interaction with the revision-limited memory 114 may be requested by the computer 102, controller 110, access interface 302, or another implement. To that end, information from the revision-limited memory 114 may be transferred to the shim 112 through the shim 112 and eventually to the respective partition window 502, 504, 506, 508, 510, 512, 514 according to the access interface 302.

Therefore, the partition windows 502, 504, 506, 508, 510, 512, 514 may be paired with respective partitions 434, 436, 438, 440, 442, 444, 446 or combinations thereof to provide access to information stored therein. As a first example, partition 434 may be associated with partition window 502. All of the information stored in partition 434 may be made available to the register interface 300 as a stream of bits from the revision-limited memory 114 through the shim 112 to the register interface based on a command from the access interface 302. For instance, a read command from the access interface 302 may be received as a command input 418 on the shim 112 along with address input 420 associated with the memory address or label for partition 434. The read output 426 may provide information from the revision-limited memory 114 according to the command input 418 and the address input 420. Accordingly, the partition window 502 may make such information available to the computer 102 through the register interface 300. In this example, partition window 504 may be associated with partition 436 and provide information stored on partition 436 similar to partition window 502.

As another example, the partition window 506 may be associated with partition 438. Data stored in partition 438 may be made available to the controller 110 through the shim 112 and the access interface 302. To ensure information in the partition window 506 is an accurate replication of the data stored in partition 438, the partition window 506 may be buffered. As such, data stored in partition 438 may be accessible in a parallel format by other circuitry (e.g., collectively accessible). To provide information to other circuitry at the same time, as may be required, information stored in partition 438 that is larger than the bit width of the revision-limited memory 114 or the obfuscator 304, is buffered for access in parallel. Buffered information may be based on a clock or registers used to store data as necessary and provide an indication when information intended to be received is fully received. As an example, a ready, valid handshake may be conducted to populate the buffer associated with partition window 506. The partition window 506 may expose only a portion of the information stored within the partition 438 to the register interface 300 while allowing access to data stored in partition 438 to the hardware interfaces 532. As an example, the partition window 506 may include the digest associated with the partition 438. The partition window 506 may send this data to the register interface 300 for dissemination. As such, the register interface 300 may not include the hardware information stored within partition 438.

In an additional example, partition window 508 may be associated with partition 440. Data stored in partition 440 may be made available to the controller 110 through the shim 112 and the access interface 302. To ensure information in the partition window 508 is an accurate replication of the data stored in partition 440, the partition window 508 may be buffered. As such, data stored in partition 438 may be accessible in a parallel format by other circuitry (e.g., collectively accessible). To provide information to other circuitry at the same time, as may be required, information stored in partition 438 that is larger than the bit width of the revision-limited memory 114 or the obfuscator 304, is buffered for access in parallel. The information stored on partition 440 may be scrambled, encrypted, obfuscated, masked, otherwise protected from dissemination, or various combinations thereof. Data stored on partition 440 may be secret, for example, storing tokens, keys, and other information necessary to secure the computer 102 from unauthorized access. As such, data from partition 440 may be transferred to the partition window 508 in the obfuscated form (e.g., scrambled, encrypted, obfuscated, masked) along with an unobfuscated digest of the data. As another example, data from partition 440 may be transferred to the partition window 508 in the unobfuscated form (e.g., scrambled, encrypted, obfuscated, masked) along with an unobfuscated digest of the data. The digest may be calculated based on the obfuscated version of the data or the unobfuscated data. The digest for partition 440 may be made available to the rest of the computer 102 through the partition window 508 and register interface 300. In one or more examples, if the data stored in one or more of the partition windows 502, 504, 506, 508, 510, 512, 514 is unobfuscated access to the partition windows 502, 504, 506, 508, 510, 512, 514 may be restricted (e.g., devoid of electrical connection to the controller 110 or computer 102). Other partitions 442, 444 may store similar data (e.g., tokens, keys) and similarly buffer the data with respective partition windows 510, 512.

As a final example, partition window 514 may be associated with partition 446. Data stored in partition 446 may be made available to the controller 110 through the shim 112 and the access interface 302. Data stored in partition 446 may be related to a life cycle of the computer 102. Partition window 514 may be restricted or disconnected from the register interface 300. As an example, partition window 514 may be devoid of an electrical connection to the register interface 300, securing information from partition 446 to the controller 110 and the hardware interfaces 532.

The description above depicting implementations of the partitions 434, 436, 438, 440, 442, 444, 446 and respective partition windows 502, 504, 506, 508, 510, 512, 514 is for explanatory purposes. Various quantities of partitions 434, 436, 438, 440, 442, 444, 446 and partition windows 502, 504, 506, 508, 510, 512, 514 may be used, and various quantities of partition windows 502, 504, 506, 508, 510, 512, 514 may correspond to the partitions 434, 436, 438, 440, 442, 444, 446. As examples, three partitions 434, 436, 438 may be used with four partition windows 502, 504, 506, 508, and three partitions 434, 436, 438 may be used with two partition windows 502, 504. Information stored on partitions 434, 436, 438, 440, 442, 444, 446 may be concatenated or divided to provide the granularity necessary for the partition windows 502, 504, 506, 508, 510, 512, 514.

Any one of the aforementioned examples may be combined or selectively used with any of the other aforementioned examples. As an example, one or more unbuffered partition windows similar to partition window 502 may be used; one or more buffered, non-secret partition windows 506 may be used; one or more buffered, secret partition windows 508 may be used; and one or more life cycle partition windows 514 may be used.

Various partition windows 502, 504, 506, 508, 510, 512, 514 may be associated with the obfuscator 304. As shown, the obfuscator 304 has access to partition windows 506, 508, 510, 512, 514. As shown in an example, the obfuscator 304 comprises control circuitry 516, encryption circuitry 518, and decryption circuitry 520. Circuitry may be added or removed to facilitate obfuscating of data stored within the partitions 434, 436, 438, 440, 442, 444, 446. The encryption circuitry 518 and the decryption circuitry 520 may be scrambling circuitry, descrambling circuitry, obfuscation circuitry, deobfuscation circuitry, tokenization, another implement, or various combinations thereof.

Obfuscation, as discussed herein, may be defined as a general term that refers to the concealment of data. The level of concealment may have various levels or categories of quality. Concealment may be characterized by the difficulty to brute-force access to the underlying data. As an example, masking may result in outputs of variable length that may be deterministic. The mask function may be a hash function. Tokenization may entirely conceal the underlying data by storing the protected data in a table, netlist, or other data structure accessible on presentation of the token. Scrambling may refer to an increased level of concealment with respect to tokenization and masking, where the underlying data is unintelligible without access to the deobfuscating key, but may be more susceptible to brute-force attacks than encryption because of the amount of possible key values or entropy within the system. Encryption, as used herein, is defined as a cryptographically secure mechanism that can withstand more-extreme brute-force attempts.

As such, obfuscation is a generic term that refers to various levels of concealment, from simple value translation to encryption with other categories or levels defined herein. The obfuscator 304 and control circuitry 516 is configured to implement the various categories and levels by replacing keys, entropy, initialization values, ciphers, and other mechanisms to alter the amount of obfuscation 304. Scrambling may improve the function of the controller 110 by balancing power, footprint, and processing constraints with a desire for increased concealment.

The obfuscator 304 may be implemented with various ciphers. Ciphers may be blocks, streams, or other implements and rely on asymmetric or symmetric keys. As an example, the PRESENT cipher may be used to obfuscate and deobfuscate obfuscated data stored on the partitions 434, 436, 438, 440, 442, 444, 446. As examples, key lengths may be 80 bits or 128 bits. Use of a block cipher can require that information fed into the encryption circuitry be limited to a predetermined number of bits (e.g., 64). As such, the data being written to the partitions 434, 436, 438, 440, 442, 444, 446 may be chunked into the block cipher length.

Access to the obfuscator 304 and the shim 112 may be controlled. To allow for larger data chunks to be processed, processing may be orchestrated through round-robin arbiters 528, 530. The arbiters 528, 530 may arbitrate according to different clock cycles. As an example, arbiter 528 may arbitrate on the same clock cycle as primary clock 404. Arbiter 528 may occur at a cycle level for each individual access of the revision-limited memory 114. As another example, arbiter 530 may include circuitry to buffer the entire digest or data array while passing chunks to the obfuscator 304. As such, the aggregate clock cycle for the arbiter 530 can be proscribed as transactions for the requested data, and control signals can remain asserted until the requester de-asserts the request such that the arbiter 530 behaves as a multiplexor for the data.

The obfuscator 304 receives stored keys from the partitions 434, 436, 438, 440, 442, 444, 446 or generated keys from the key derivation circuitry 526. The key derivation circuitry 526 is in conductive communication with the obfuscator 304, a random-number generator 536, and partitions 434, 436, 438, 440, 442, 444, 446 that hold obfuscating root keys. The controller 110 may also include a timer 522 to create pseudo-randomly distributed signals for checking partitions 434, 436, 438, 440, 442, 444, 446 against digests stored within the partitions 434, 436, 438, 440, 442, 444, 446 and buffers of the partition windows 502, 504, 506, 508, 510, 512, 514. The timer 522 may be a linear-feedback shift register. As an example, the linear-feedback shift register may be populated with a random number from the random-number generator 536. The linear-feedback shift register may then shift based on the primary clock 404 or another clock signal. If the least-significant bit or most-significant bit is a particular value, a check may be performed to ensure data integrity within the partitions 434, 436, 438, 440, 442, 444, 446 and buffers of the partition windows 502, 504, 506, 508, 510, 512, 514. The random-number generator 536 may be of various types and implements. As an example, the random-number generator 536 may be a cryptographically secure pseudo-random-number generator or other variations of random-number generators.

The controller 110 may include default circuitry 534 to output a non-zero-bit array during boot. As an example, the non-zero-bit array may be based on the last data in the register interface 300 or a predefined bit array. The default circuitry 534, the register interface 300, and the partition windows 502, 504, 506, 508, 510, 512, 514 may be multiplexed to provide selection of the output from the default circuitry 534 during boot and output from the partition windows 502, 504, 506, 508, 510, 512, 514 during normal operation. The default circuitry 534 may also output the non-zero-bit array during boot to the hardware interfaces 532.

Figure 6:
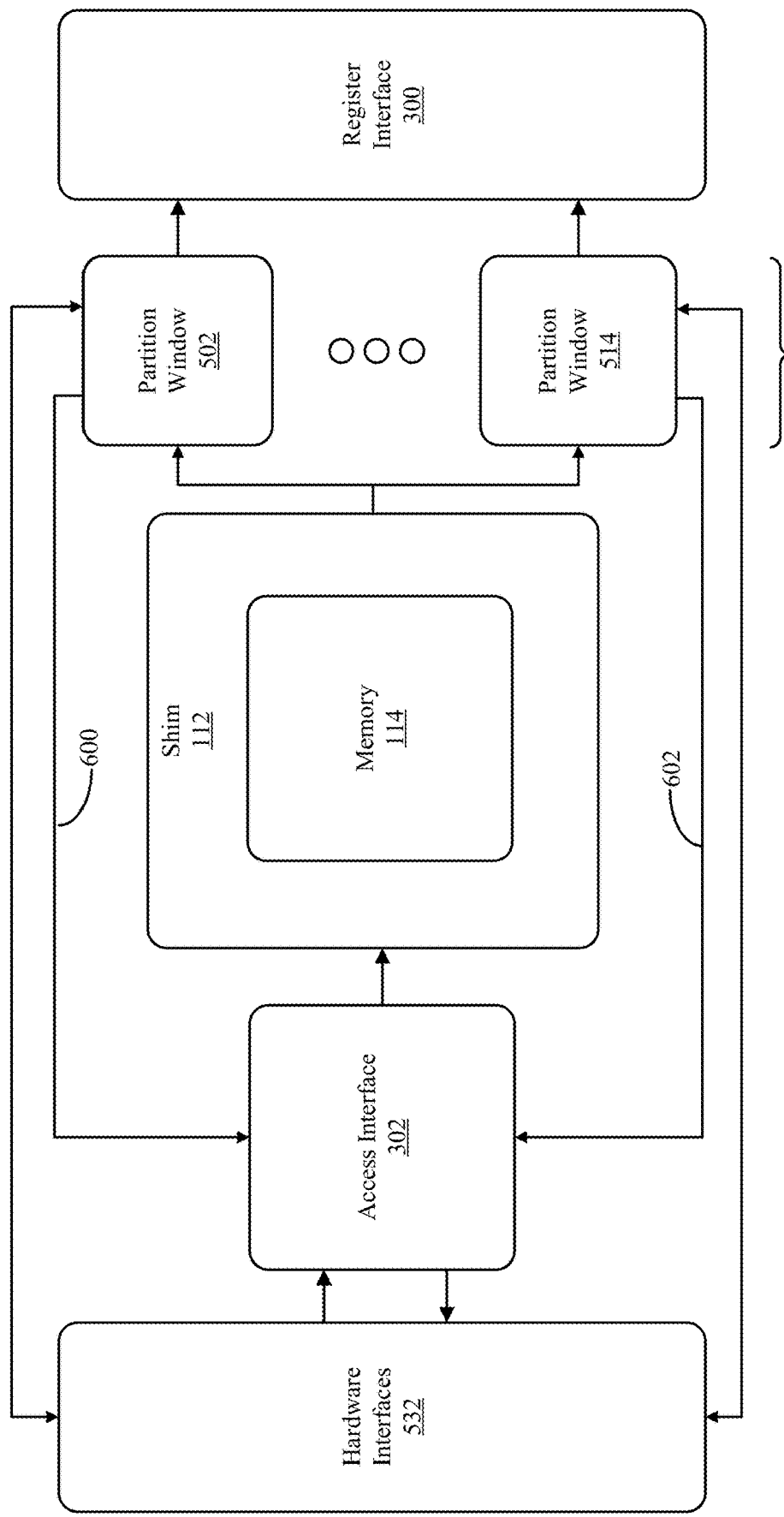
FIG. 6 illustrates an example access-controller implementation in accordance with one or more implementations of the present disclosure.

Referring to FIG. 6, an example access interface 302 implementation in accordance with one or more implementations of the present disclosure is shown. The access interface 302 orchestrates communications between the hardware interfaces 532, the partition windows 502, 504, 506, 508, 510, 512, 514, and the shim 112.

As shown, the access interface 302 sends requests to the shim 112 to access the revision-limited memory 114. The shim 112 receives the requested data from the revision-limited memory 114 and sends the data to the respective partition windows 502, 504, 506, 508, 510, 512, 514 based on the memory location or labels provided through the address input 420. Once populated, the partition windows 502, 504, 506, 508, 510, 512, 514 communicate with the access interface 302 over respective access lock buses 600, 602. As an example, the partition windows 502, 504, 506, 508, 510, 512, 514 may provide one or more bits across the access lock buses 600, 602 to the access interface 302 to prevent interactions with respective partitions 434, 436, 438, 440, 442, 444, 446. As an example, when the partition windows 502, 504, 506, 508, 510, 512, 514 have a valid digest, as validated by the hardware interfaces 532, the partition windows 502, 504, 506, 508, 510, 512, 514 send an indication to the access interface 302 over the access lock buses 600, 602. The indication may be one or more bits, and the bit values may be unique to the respective partition window 502, 504, 506, 508, 510, 512, 514. The hardware interfaces may include 532 a life cycle interface 524. The life cycle interface may provide orchestration of life cycle state indications and writing life cycle information to the revision-limited memory 114.

Example Methods

Figure 7:
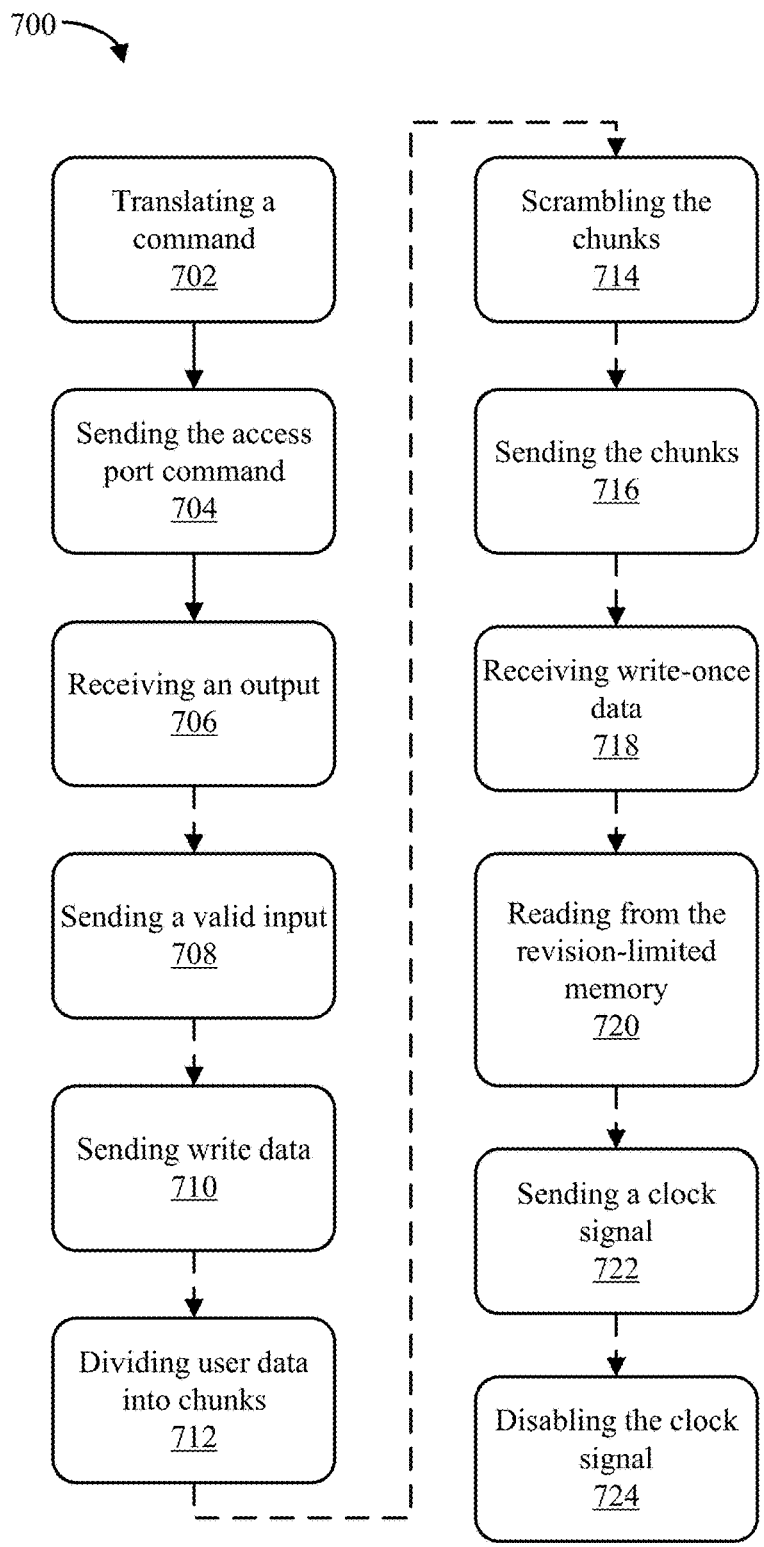
FIG. 7 illustrates an example method in accordance with one or more implementations of the present disclosure.

In FIG. 7, an example method 700 in accordance with one or more implementations of the present disclosure is shown. The method 700 is shown as a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made for example only. The techniques are not limited to performance by one entity or multiple entities operating on one device.

In block 702, the generic command is translated. The generic command may be various combinations of register values or bit lines intended to interact with the revision-limited memory 114. The generic command may be an open-source command that is publicly available and published to a website as opposed to the access port command that may be confidential or otherwise unavailable. As an example, the generic command may be a read command associated with a particular memory address. As another example, the generic command may be a write command associated with a particular memory address. In some applications, the generic command may consist entirely of a read or write command and a memory address. In other applications, the generic command may include additional register values or bit lines. For example, the generic command can include clock signals, readiness information, validity information, size constraints, data, error information, or various combinations thereof. This context-specific information may indicate an operation intended for the revision-limited memory 114, allowing interaction with the memory arrays therein. Although indicative of an operation, the revision-limited memory 114 may not be efficiently configured to receive the information orchestrated or communicated in such a way. That is, the information may require translation to ensure the interaction desired by the generic command is conducted in an efficient manner. As an example, sending erroneous instructions to the revision-limited memory 114 may initiate error sequences to occur or invalid data to be written or returned. When dealing with revision-limited memory 114, the accuracy of the information written can be paramount. As such, translation of the generic command to a selected access port command for the same operation can improve the efficiency of reads and writes associated with the revision-limited memory 114.

As an example, the generic command may include various combinations of inputs and outputs 404, 406, 408, 410, 412, 414, 416, 418, 420, 422, 424, 426, 428 to the shim 112. The generic command may be translated into an access port command comprising a combination of first interface 430, second interface 432, other interfaces, and various combinations thereof. As an example, an generic command may be comprised of a read command on command input 418 and a memory location (e.g., one of the partitions 434, 436, 438, 440, 442, 444, 446 or portions thereof) on the address input 420. Through circuitry, shim 112 may translate the generic command to an access port command used over the second interface 432, allowing data at the memory location to be read from the revision-limited memory 114.

In block 704, the access port command is sent to the revision-limited memory 114. The access port command may be sent over the first interface 430, the second interface 432, another interface, or various combinations thereof. As an example, the access port command may be sent over the second interface 432 to read from the revision-limited memory 114. As another example, the access port command may be sent over the first interface 430 to write to the revision-limited memory.

In block 706, an output may be received based on the access port command. The output may be various register outputs and bit lines. As an example, the output may be one or more of the outputs 408, 412, 424, 426, 428 from the shim 112. In the case of a write operation, the output may be an acknowledgment of a successful write over the error output 428 or a ready output 412, indicating that the revision-limited memory 114 is ready for another instruction. In the case of a read operation, the output may be a valid output 424, indicating that the entire memory location has been ready and has been retrieved. As other examples, the output may be the read data output 426 or the error output 428.

As another example, the operation may be a built-in self-test for the revision-limited memory 114. As an example, the command input 418 is an initialization command (e.g., "11"). The initialization command may be issued by the access interface 302, and the initialization command may prompt the built-in self-test, requiring the revision-limited memory 114 to perform the built-in self-test. The built-in self-test may scan a portion of the revision-limited memory (e.g., one of the partitions 434, 436, 438, 440, 442, 444, 446, or portions thereof) for errors. An error may be a logical-HIGH or a logical-LOW bit, depending on how the revision-limited memory 114 is biased. An error may be reported through the error output 428, indicating the results of the built-in self-test as discussed herein. An error correcting code (ECC) may be used to correct soft errors according to the built-in self-test actuated by the generic command. As an example, if the address space specified by the generic command includes a bit that erroneously reads as a zero or a one, the ECC corrects the erroneous bit by inverting its value.

The shim 112 may ensure that power-on and boot of the revision-limited memory are properly conducted and provide backpressure to ensure requests are not made by the controller 110 until the revision-limited memory 114 is ready. As an example, the command input 418 may initiate a boot sequence of the revision-limited memory. Upon completion of the boot, a ready output indication may be presented to indicate that the revision-limited memory 114 and the shim 112 are ready to receive instruction. The ready output 412 may provide such an indication. In block 708, the valid input 414 may provide an indication that the information transmitted has been completely transmitted.

In block 710, write data may be sent with the access port command over the first interface 430 and the second interface 432. As an example for a write operation, an open-source write command may be translated into an access port write command and accompany the associated data to be written over one or more of the first interface 430 or the second interface 432 to the revision-limited memory 114. The size input 416 may be equal to a block size (e.g., 64 bits) of the obfuscator 304. As an example, the obfuscator 304 may employ a block cipher (e.g., PRESENT) to obfuscate or unobfuscate data written to the revision-limited memory 114.

In block 712, user data may be chunked. User data may be various information associated with the controller 110. As an example, user data may be data stored in one of the partitions 434, 436, 438, 440, 442, 444, 446 or portions thereof. The user data may be sized larger than the block size associated with the obfuscator 304. Chunking may be performed by circuitry associated with arbiter 530 or other circuitry associated with the controller 110. As an example, the arbiter 530 may receive the user data associated with one of the partitions 434, 436, 438, 440, 442, 444, 446 with an arbiter buffer. The arbiter buffer may chunk the user data through a multiplexor or other circuitry to the arbiter 530 for encryption or decryption by the obfuscator 304.

In block 714, the chunks divided from the user data are sent to the obfuscator 304. The chunks may be arbitrated by the arbiter 530. As such, the block cipher associated with the obfuscator 304 can be used to obfuscate or deobfuscate the chunks and send them to the revision-limited memory 114. User data not requiring obfuscation or deobfuscation may be sent directly between the partition windows 502, 504, 506, 508, 510, 512, 514 and the partitions 434, 436, 438, 440, 442, 444, 446. The chunks may be sent to the revision-limited memory 114 with the translated access port command.

In block 716, the chunks divided from the user data are sent to the obfuscator 304. The chunks may be arbitrated by arbiter 530. As such, the block cipher associated with the obfuscator 304 can be used to obfuscate or deobfuscate the chunks and send them to the revision-limited memory 114. User data not requiring obfuscation or deobfuscation may be sent directly between the partition windows 502, 504, 506, 508, 510, 512, 514 and the partitions 434, 436, 438, 440, 442, 444, 446. The chunks may be sent to the revision-limited memory 114 according to the generic command, which may be translated into an access port command.

In block 718, revision-limited data may be retrieved from the revision-limited memory 114. The revision-limited data from the revision-limited memory 114 may be divided into chunks or chunked by the arbiter 530 or another implement. During a read operation, the chunks may be sent to the partition windows 502, 504, 506, 508, 510, 512, 514.

In block 720, the revision-limited data may be read from the revision-limited memory 114 according to the operation specified by the access port command and the generic command. In block 722, a clock signal may drive the primary clock 404. The primary clock 404 may be based on a clock signal derived from two or more glitchless clock multiplexers, which is then sent to the revision-limited memory 114. The controller 110 may include the glitchless clock multiplexers may be different frequencies. In one example, one of the frequencies may be a multiple of the other of the frequencies. As such, a selection bit may be propagated to select one of the clock signals to prevent glitches. The signals may be encoded life-cycle broadcast signals, including information related to the state of the revision-limited memory 114.

In block 724, the primary clock 404 may be disconnected from the two glitchless clock multiplexers, disabling the clock signal derived from the glitchless clock multiplexers and providing a stable primary clock 404. The primary clock 404 may be a 24-megahertz (MHz) signal. The partition window 514 retaining the life cycle information may indicate when the clock signal derived from the glitchless clock multiplexers may be disabled. As examples, the glitchless clock multiplexers may be enabled when the life cycle state of the revision-limited memory 114 is in a raw state or a test state. A raw state may be a default state for the revision-limited memory 114. The only function that may be available is a transition to the test state. The test state or states may include a locked state for transport of the revision-limited memory 114, controller 110, or computer 102. The test state may further include an unlocked state where testing of the revision-limited memory 114 is authorized.

Figure 8:
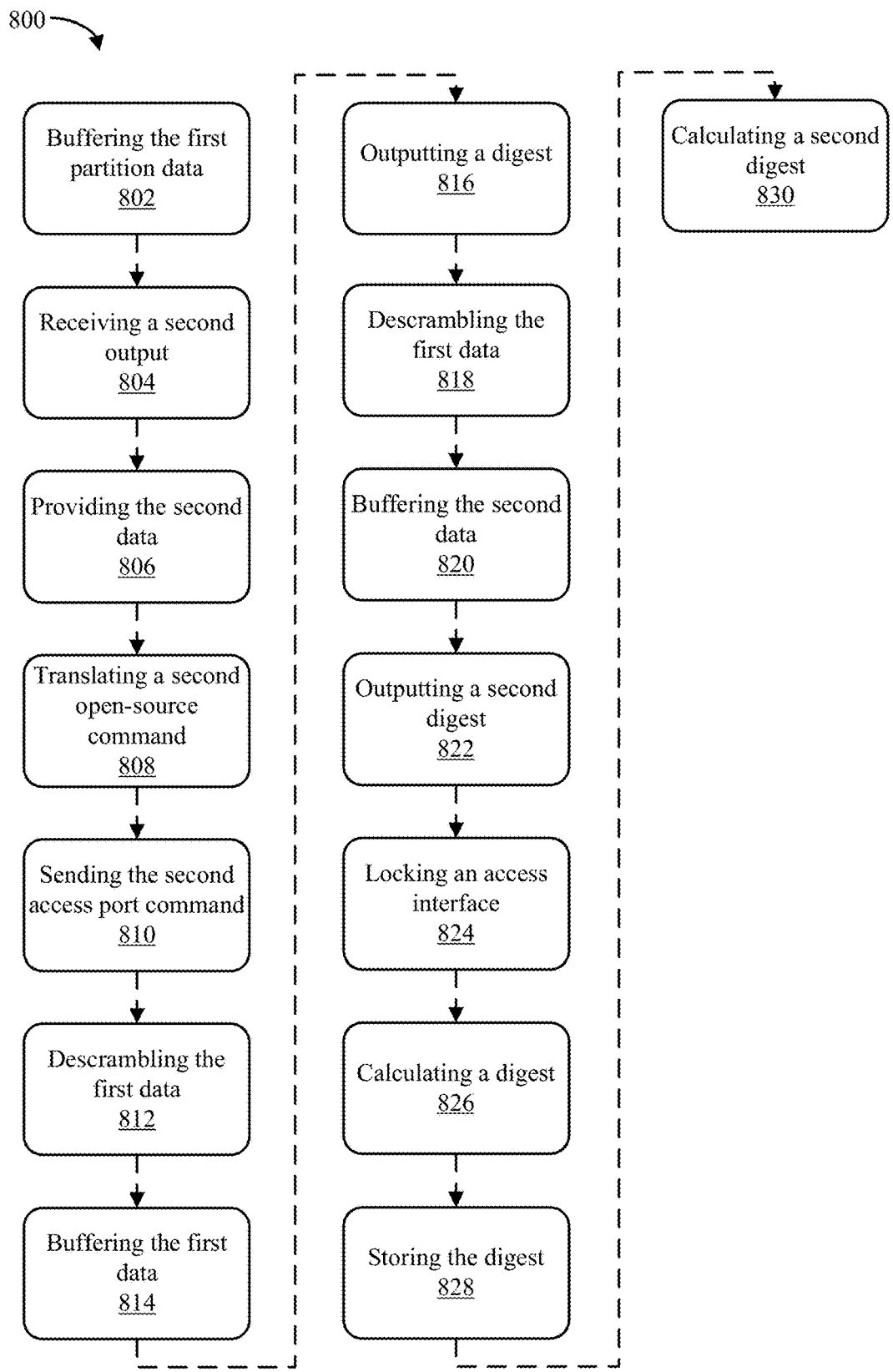
FIG. 8 illustrates a first continued or additional example method in accordance with one or more implementations of the present disclosure.

In FIG. 8, a first continued or additional example method 800 in accordance with one or more implementations of the present disclosure is shown. The method 800 is shown as a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made for example only. The techniques are not limited to performance by one entity or multiple entities operating on one device. The techniques described with regard to FIG. 8 may be combined with any other techniques described herein.

Data stored on the revision-limited memory 114 may be organized in partitions 434, 436, 438, 440, 442, 444, 446. Operations may write data to the partitions 434, 436, 438, 440, 442, 444, 446, and in block 802, an operation may access an address space associated with one or more of the partitions 434, 436, 438, 440, 442, 444, 446 and output the data read on the read data output 426. As an example, the address space may be used as an input to the address input 420 with a read command on the command input 418. As an example, partition 434 may be associated with partition window 502, and the data stored in the address space may be provided as an unbuffered or buffered partition window 502. As such, the register interface 300 may include control-status registers for the particular address space. For instance, a 64-bit partition window may be associated with a 64-bit register space of the register interface 300. As an example, the data retrieved from the revision-limited memory 114 may be buffered in one of the partition windows 502, 504, 506, 508, 510, 512, 514 that are buffered. Various implements of data buffers may be used to store the information retrieved from the revision-limited memory 114. The data may be buffered according to a clock associated with the controller 110, the access interface 302, the obfuscator 304, or another clock.

Another command may be executed to access a second address space of the revision-limited memory 114. At block 804 a second output is received, which includes data associated with the second address space. The second data may be associated with one or more of the partitions 434, 436, 438, 440, 442, 444, 446 and stored in a respective partition window 502, 504, 506, 508, 510, 512, 514. In block 806, the second data may be provided by the respective partition window 502, 504, 506, 508, 510, 512, 514, whether buffered or unbuffered, obfuscated or unobfuscated.

In block 808, a second generic command may be translated. The second generic command may be various combinations of register values or bit lines intended to interact with the revision-limited memory 114. As an example, the second generic command may be a read command associated with a particular memory address. As another example, the second generic command may be a write command associated with a particular memory address. In some applications, the second generic command may consist entirely of a read or write command and a memory address. In other applications, the second generic command may include additional register values or bit lines. For example, the second generic command can include clock signals, readiness information, validity information, size constraints, data, error information, or various combinations thereof. This context-specific information may indicate an operation intended for the revision-limited memory 114, allowing interaction with the memory arrays therein. Although indicative of an operation, the revision-limited memory 114 may not be efficiently configured to receive the information orchestrated or communicated in such a way. That is, the information may require translation to ensure the interaction desired by the second generic command is conducted efficiently. As an example, sending erroneous instructions to the revision-limited memory 114 may cause error responses or invalid data to be written or returned. When dealing with revision-limited memory 114, the accuracy of the information written can be paramount. As such, translation of the second generic command to a selected access port command for the same operation can improve the efficiency of reads and writes associated with the revision-limited memory 114.

As an example, the second generic command may include various combinations of inputs and outputs 404, 406, 408, 410, 412, 414, 416, 418, 420, 422, 424, 426, 428 to the shim 112. The second generic command may be translated into a second access port command comprising a combination of first interface 430, second interface 432, other interfaces, and various other combinations thereof. As an example, a second generic command may be comprised of a read command on command input 418 and a memory location (e.g., one of the partitions 434, 436, 438, 440, 442, 444, 446 or portions thereof) on the address input 420. Through circuitry, the shim 112 may translate the generic command to an access port command used over the second interface 432, allowing data at the memory location to be read from the revision-limited memory 114.

In block 810, the second access port command is sent to the revision-limited memory 114. The second access port command may be sent over the first interface 430, the second interface 432, another interface, or various combinations thereof. As an example, the second access port command may be sent over the second interface 432 to read from the revision-limited memory 114. As another example, the access port command may be sent over the first interface 430 to write to the revision-limited memory. A second output may be received based on the access port command. The second output may be various register outputs and bit lines. As an example, the second output may be one or more of the outputs 408, 412, 424, 426, 428 from the shim 112. In the case of a write operation, the output may be an acknowledgment of a successful write over the error output 428 or a ready output 412, indicating that the revision-limited memory 114 is ready for another instruction. In the case of a read operation, the second output may be a valid output 424, indicating that the entire memory location has been ready and has been retrieved. As other examples, the second output may be the read data output 426 or the error output 428. In one instance, the output and the second output may be stored in respective partition windows (e.g., partition window 506, 508). In another example, the first output and second output may be exposed to the register interface 300 through partition windows 502, 504.

As such, first data and second data may be read and provided from the revision-limited memory 114 to portions of the controller 110. In blocks 812, 814, 816, 818, 820, 822, the first data, the second data, or both may be deobfuscated. In one example, one or more of the first data or second data may be deobfuscated by the obfuscator 304 and buffered within one or more of the partition windows 502, 504, 506, 508, 510, 512, 514. In another example, one or more of the first data or second data may remain obfuscated and buffered within one or more of the partition windows 502, 504, 506, 508, 510, 512, 514. A digest for the respective first data or second data may be calculated by the controller 110. The digests may be stored within respective partitions 434, 436, 438, 440, 442, 444, 446. The digests may be defined by any uniqueness algorithm or cryptographic mechanism (e.g., cyclic redundancy check, checksums, keyed cryptographic hash functions, unkeyed cryptographic hash functions). The digests may be signed by a key.

In block 824, the access interface 302 may be locked, based on the presence of a digest within the partition windows 502, 504, 506, 508, 510, 512, 514 or another indication of completed partitions 434, 436, 438, 440, 442, 444, 446. As an example, the access interface 302 sends out an initialization command through the shim 112 to the revision-limited memory 114. After initialization, the access interface 302 may iterate through the partitions 434, 436, 438, 440, 442, 444, 446, reading from the respective memory addresses and providing such information to the partition windows 502, 504, 506, 508, 510, 512, 514. Digests may be calculated or retrieved for the partitions 434, 436, 438, 440, 442, 444, 446 and, if calculated, the digest may be stored with the respective partitions 434, 436, 438, 440, 442, 444, 446. The partition windows 502, 504, 506, 508, 510, 512, 514, having a completed digest, are then configured to send an access lock of one or more bits (e.g., a lock byte) to the access interface 302 to indicate that reads, writes, or both associated with the revision-limited memory 114 for the given partition 434, 436, 438, 440, 442, 444, 446 are inhibited by the access interface 302 to prevent redundant requests, improving the efficiency of the revision-limited memory 114. Partitions 434, 436, 438, 440, 442, 444, 446 may be write locked to prevent further modification of the data therein to ensure consistency and integrity of the data, and obfuscated partitions 434, 436, 438, 440, 442, 444, 446 can be read locked to prevent read requests that may compromise the secrecy and confidentiality of the data stored therein.

In blocks 826, 830, a digest may be calculated for the respective partitions 434, 436, 438, 440, 442, 444, 446 or portions thereof. The digests may be defined by any uniqueness algorithm or cryptographic mechanism (e.g., cyclic redundancy check, checksums, keyed cryptographic hash functions, unkeyed cryptographic hash functions). The digests may be signed by a key. The digests may be based on obfuscated or unobfuscated data stored within the respective partitions 434, 436, 438, 440, 442, 444, 446. In an example where obfuscated data within the partitions 434, 436, 438, 440, 442, 444, 446 is stored in the respective partition windows 502, 504, 506, 508, 510, 512, 514 unobfuscated or in clear text, the obfuscator 304 may reobfuscate the from the respective partition window 502, 504, 506, 508, 510, 512, 514 before calculating the digest. For instance, the obfuscated information is read from partition 444 and deobfuscated by the obfuscator 304. The unobfuscated data from partition 444 is stored in partition window 512 with a digest corresponding to the obfuscated data. As such, the obfuscator 304 may reobfuscate the data stored in the partition window 512 for proper comparison between the calculated digest and the digest retrieved from the partition. In block 828, the digest may be stored with the respective partitions 434, 436, 438, 440, 442, 444, 446.

Figure 9:
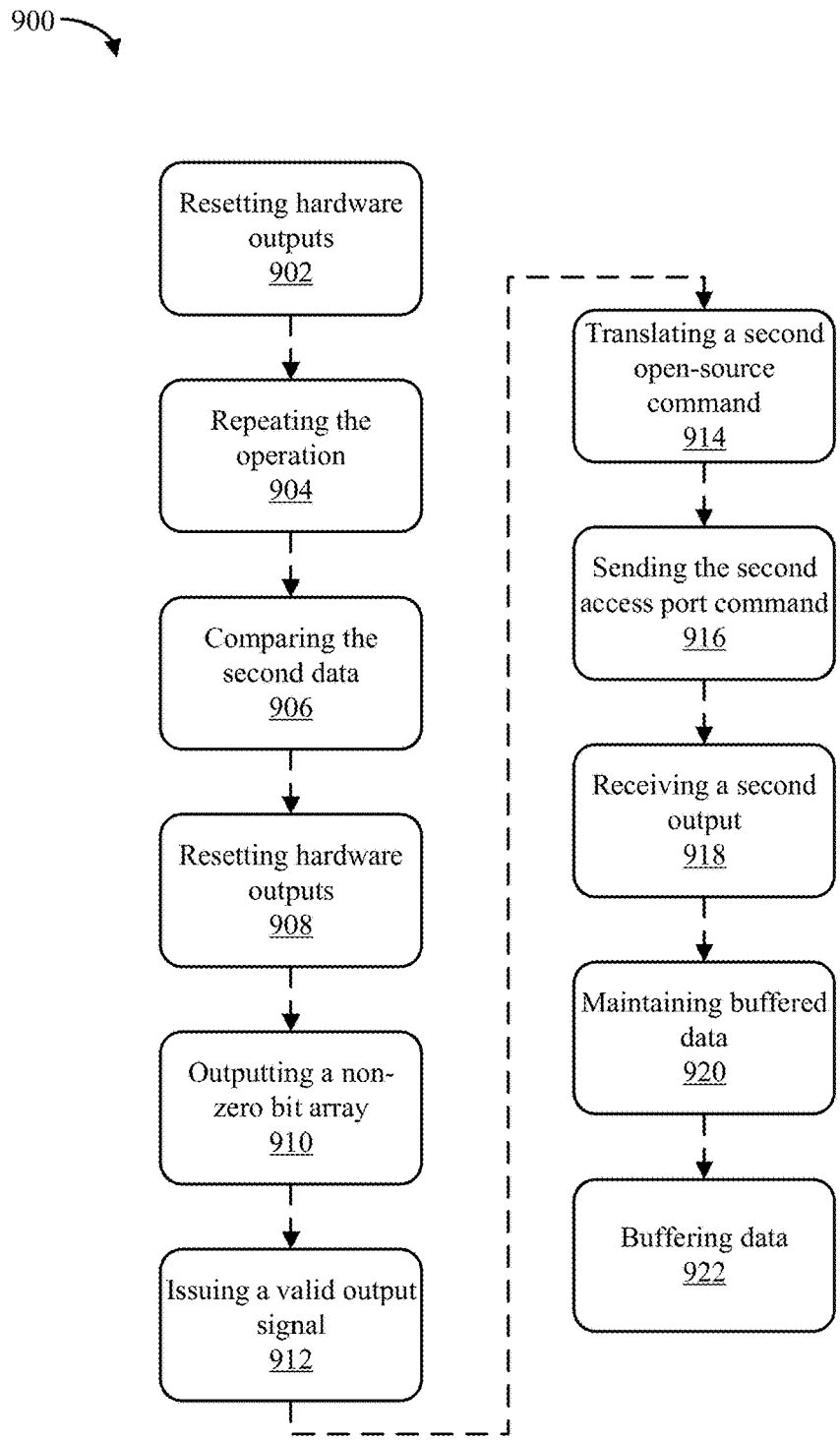
FIG. 9 illustrates a second continued or additional example method in accordance with one or more implementations of the present disclosure.

In FIG. 9, a second continued or additional example method 900 in accordance with one or more implementations of the present disclosure is shown. The method 900 is shown as a set of blocks that specify operations and steps performed but are not necessarily limited to the order or combinations shown for performing the operations by the respective blocks. Further, any of one or more operations may be repeated, combined, reorganized, omitted, or linked to provide a wide array of additional and/or alternative methods. In portions of the following discussion, reference may be made to the examples of the preceding figures, reference to which is made for example only. The techniques are not limited to performance by one entity or multiple entities operating on one device. The techniques described with regard to FIG. 9 may be combined with any other techniques described herein.

In block 902, once access of the respective partitions 434, 436, 438, 440, 442, 444, 446 has been locked, based on the digest, integrity checks may be performed on the partition windows 502, 504, 506, 508, 510, 512, 514. As an example, all of the partitions 434, 436, 438, 440, 442, 444, 446 that are buffered may be configured with an 8-bit ECC code for blocks that have the same size as the block size of the obfuscator 304. A digest of the partition windows 502, 504, 506, 508, 510, 512, 514 or portion thereof is calculated according to at least pseudo-random intervals, as discussed herein, and compared with the digest stored in the partition windows 502, 504, 506, 508, 510, 512, 514. This check may be performed to ensure that the partition windows 502, 504, 506, 508, 510, 512, 514 remain consistent to prevent fault attacks. If the calculated digest is not equivalent to the digest stored in the respective partition window 502, 504, 506, 508, 510, 512, 514, the controller 110 can send out an error and reset the controller 110 and respective hardware. As an example, the entire controller 110 may be reset to hardware or factory defaults. The controller 110 may be rebooted and information reread from the revision-limited memory 114 to ensure the integrity of the data. The controller 110 may further enter a terminal error state, and thus inoperable, until the system is reset when the action is from an external agent (e.g., users, computer processors, and external error handling).

Aside from digest comparisons, the controller 110 may also compare the data stored in the partition windows 502, 504, 506, 508, 510, 512, 514 with the data stored in the respective partitions 434, 436, 438, 440, 442, 444, 446 on the revision-limited memory 114. Such integrity checks may be performed at random or pseudo-random intervals based on the implements discussed herein or other implements. The controller 110 or portion thereof may read from the partition windows 502, 504, 506, 508, 510, 512, 514 and from the respective partitions 434, 436, 438, 440, 442, 444, 446, then compare the data. The controller 110 or portion thereof may also read only the digests stored in the partition windows 502, 504, 506, 508, 510, 512, 514 for comparison with the digests stored in the respective partitions 434, 436, 438, 440, 442, 444, 446.

In block 904, the operation was a read operation of particular address spaces. The operation may be repeated to continuously monitor the integrity of data stored in the partition windows 502, 504, 506, 508, 510, 512, 514. As an example, the operation may provide first data associated with one of the partitions 434, 436, 438, 440, 442, 444, 446. Such data may be stored in the respective partition window 502, 504, 506, 508, 510, 512, 514. The operation may be repeated following a random time-interval to compare the second data retrieved during the repeated operation with the first data stored in the respective partition window 502, 504, 506, 508, 510, 512, 514 in block 906. Other operations may be performed between the first operation and the repeated operation. In block 908, if the first data is not equivalent to the second data, the controller 110 can send out an error and reset the controller 110 and respective hardware. As an example, the entire controller 110 may be reset to hardware or factory defaults. The controller 110 may be rebooted and information reread from the revision-limited memory 114 to ensure the integrity of the data.

In blocks 910, 912, the controller 110 or revision-limited memory 114 may boot during an initialization power-up, a reset, or a reboot. While booting, the controller 110 may include default circuitry 534 to transmit a non-zero-bit array through the register interface 300.

In block 914, a second generic command may be translated. The second generic command may be various combinations of register values or bit lines intended to interact with the revision-limited memory 114. As an example, the second generic command may be a write command associated with a particular memory address. In some applications, the second generic command may consist entirely of a write command and a memory address. In other applications, the second generic command may include additional register values or bit lines. For example, the second generic command can include clock signals, readiness information, validity information, size constraints, data, error information, or various combinations thereof. This context-specific information may indicate an operation intended for the revision-limited memory 114, allowing interaction with the memory arrays therein. Although indicative of an operation, the revision-limited memory 114 may not be efficiently configured to receive the information orchestrated or communicated in such a way. That is, the information may require translation to ensure the interaction desired by the second generic command is conducted efficiently. As an example, sending erroneous instructions to the revision-limited memory 114 may cause error responses or invalid data to be written or returned. When dealing with revision-limited memory 114, the accuracy of the information written can be paramount. As such, translation of the second generic command to a selected access port command for the same operation can improve the efficiency of reads and writes associated with the revision-limited memory 114.

As an example, the second generic command may include various combinations of inputs and outputs 404, 406, 408, 410, 412, 414, 416, 418, 420, 422, 424, 426, 428 to the shim 112. The second generic command may be translated into a second access port command comprising a combination of first interface 430, second interface 432, other interfaces, and various other combinations thereof. As an example, a second generic command may be comprised of a read command on command input 418 and a memory location (e.g., one of the partitions 434, 436, 438, 440, 442, 444, 446 or portions thereof) on the address input 420. Through circuitry, shim 112 may translate the generic command to an access port command used over the second interface 432, allowing data at the memory location to be read from the revision-limited memory 114.

In block 916, the second access port command is sent to the revision-limited memory 114. The second access port command may be sent over the first interface 430, the second interface 432, another interface, or various combinations thereof. As an example, the second access port command may be sent over the first interface 430 to write to the revision-limited memory. In block 918, a second output may be received based on the access port command. The second output may be various register outputs and bit lines. As an example, the second output may be one or more of the outputs 408, 412, 424, 426, 428 from the shim 112. In the case of a write operation, the output may be an acknowledgment of a successful write over the error output 428 or a ready output 412, indicating that the revision-limited memory 114 is ready for another instruction and the write operation was successful.

In block 920, the data buffered in the respective partition window 502, 504, 506, 508, 510, 512, 514 corresponding to the written memory address is maintained until a reset of the controller 110, computer 102, or revision-limited memory 114 occurs. As an example, the controller 110 may read from the revision-limited memory 114 at the beginning of a power cycle to define the data in partition windows 502, 504, 506, 508, 510, 512, 514. During operation, a write may be performed to the revision-limited memory 114. Instead of updating the partition windows 502, 504, 506, 508, 510, 512, 514 based on the most recent write, the data within the partition windows 502, 504, 506, 508, 510, 512, 514 is maintained until the next power cycle of the computer 102, controller 110, or revision-limited memory 114. After the power cycle, the partition windows 502, 504, 506, 508, 510, 512, 514 are updated with the respective data from partitions 434, 436, 438, 440, 442, 444, 446 to include the recently written data.

In block 922, data from the partitions 434, 436, 438, 440, 442, 444, 446 is buffered. The partition windows 502, 504, 506, 508, 510, 512, 514 may be configured to buffer data received from the access interface 302. Buffers may include additional memory locations or registers within the controller 110. In an example, the partition windows 502, 504, 506, 508, 510, 512, 514 may be a set of partition windows 502, 504, 506, 508, 510, 512, 514 having a quantity. As an example, the quantity may be seven. A subset of the partition windows 502, 504, 506, 508, 510, 512, 514 may be buffered that are lesser in number than the quantity (e.g., five partition windows). Buffering may be based on a clock signal or a valid signal that indicates all information corresponding to the respective partition 434, 436, 438, 440, 442, 444, 446 is loaded within the respective partition window 502, 504, 506, 508, 510, 512, 514. As an example, the hardware interfaces 532 may require accurate information to be loaded within the partition windows 502, 504, 506, 508, 510, 512, 514 in order to perform accurate integrity checks and other operations. As such, the buffered partitions may only be made available to the hardware interfaces 532 after the entire memory space of the partition windows 502, 504, 506, 508, 510, 512, 514 is full, the data matches a digest loaded into the partition windows 502, 504, 506, 508, 510, 512, 514, a predetermined quantity of clock signals, or another indication of a complete set of data is promulgated.

Figure 10:
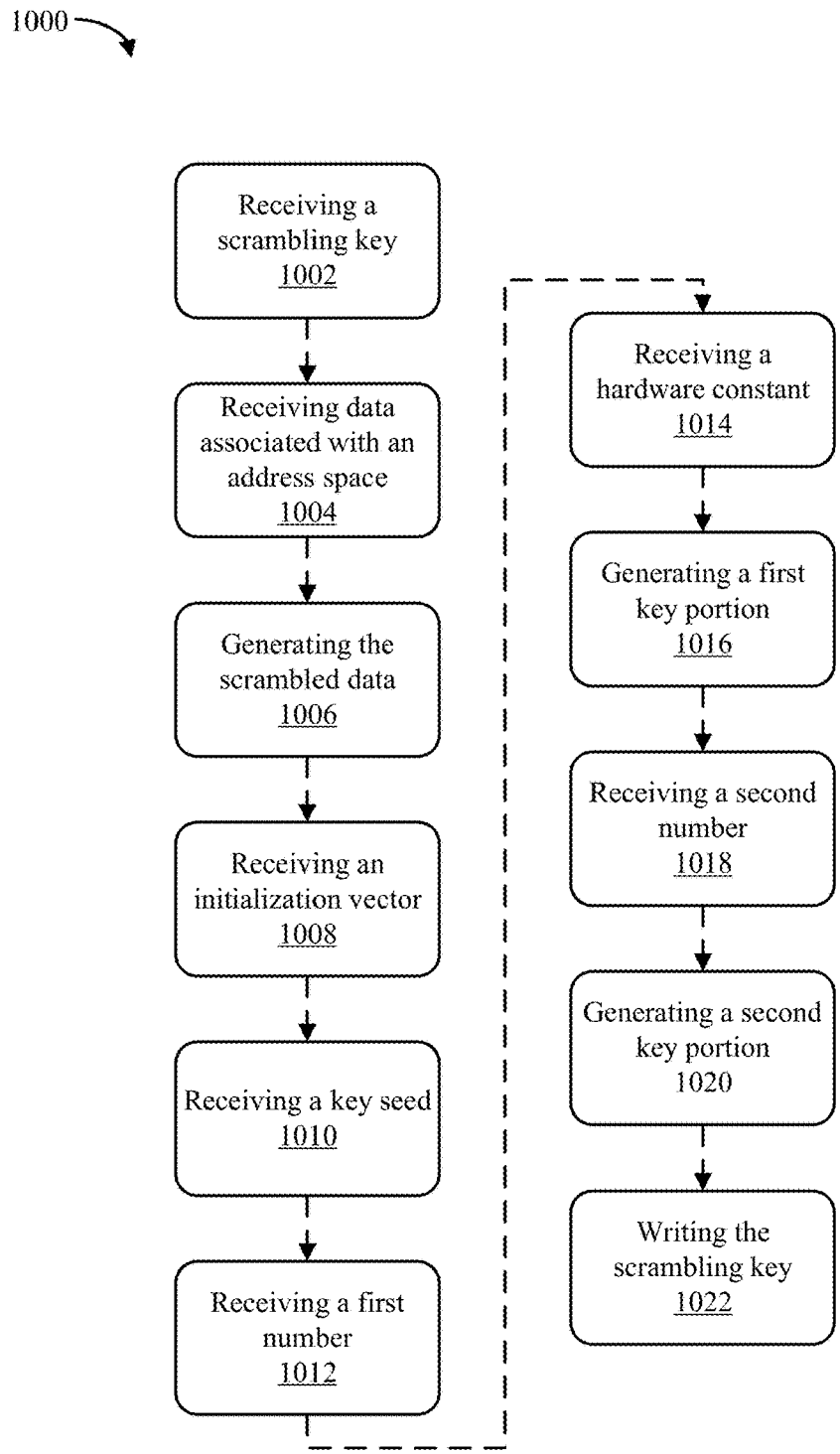
FIG. 10 illustrates a third continued or additional example method in accordance with one or more implementations of the present disclosure.

In FIG. 10, a third continued or additional example method 1000 in accordance with one or more implementations of the present disclosure is shown. The method 1000 is shown as a set of blocks that specify operations and steps performed but are not necessarily limited to the order or combinations shown for performing the operations by the respective blocks. Further, any of one or more of the operations may be repeated, combined, reorganized, omitted, or linked to provide a wide array of additional and/or alternate methods. In portions of the following discussion, reference may be made to the examples of the preceding figures, reference to which is made for example only. The techniques are not limited to performance by one entity or multiple entities operating on one device. The techniques described with regard to FIG. 10 may be combined with any other techniques described herein.

In block 1002, an obfuscating key is received. The obfuscating key may be stored in one or more of the partitions 434, 436, 438, 440, 442, 444, 446 and loaded into the partition windows 502, 504, 506, 508, 510, 512, 514. As such, the obfuscating key may be received from the partition windows 502, 504, 506, 508, 510, 512, 514. The obfuscating key may have a length corresponding to the desired security or cipher employed by the obfuscator 304.

In block 1004, data is received. The data may be associated with the address input 420 associated with the address space of the operation. In block 1006, the obfuscated data is generated according to the obfuscating key. That is, the data may be iteratively processed by the obfuscator 304 according to the block size of the obfuscator 304 to create the obfuscated data. Obfuscation may be implemented to encrypt, digest, hash, scramble, perform data manipulations, or various combinations thereof.

In block 1008, an initialization vector may be received. The initialization vector may be generated by the random-number generator 536. The initialization vector may be a nonce. Salt may also be used. The controller 110 may be run in obfuscation modes that do not require an initialization vector. The initialization vector may be generated upon manufacture and stored in a netlist. The netlist may be a dictionary or other data structure of information accessible by a token. The token may be an indicator of the initialization vector, stored in unprotected or unobfuscated storage, thereby limiting access to the initialization vector. The netlist may be preconfigured by a creator of the controller 110 or the revision-limited memory 114 and hardcoded within the controller 110.

In block 1010, a key seed may be received. The key seed may be stored within the revision-limited memory 114. As an example, the key seed may be used with the initialization vector within the obfuscator 304 to define a portion of the obfuscating key. As an example, the obfuscator 304 may include a block cipher. The block cipher may be iterated a predetermined amount (e.g., 31) using the initialization vector as the data input and the key seed as the encryption key or vice versa. As an example, the initialization vector may be stored as a token on the partitions 434, 436, 438, 440, 442, 444, 446. During a key-generation process, the initialization vector token is retrieved from the partition windows 502, 504, 506, 508, 510, 512, 514, and the respective initialization vector is retrieved from the netlist. The obfuscator 304 may perform a similar operation to retrieve the key seed, which may be stored within the partitions 434, 436, 438, 440, 442, 444, 446 or a netlist. As such, the obfuscator 304 can output an obfuscated version of the initialization vector according to the key seed.

In block 1012, a first random number is received. As an example, during a key-generation process, the random-number generator 536 may provide entropy to the key-generation process in the form of a generated number from random-number generator 536. In a similar fashion, the obfuscated version of the initialization vector may be further obfuscated by the obfuscator 304 using the first random number as entropy. As such, the obfuscator 304 can output an obfuscated version of the obfuscated initialization vector.

In block 1014, a hardware constant may be received. The hardware constant may be tied to the controller 110, computer 102, revision-limited memory 114, other circuitry, or various combinations thereof. The hardware constant or finalization constant may be stored in the netlist along with the initialization vector. The hardware constant may be further employed to obfuscate the previously obfuscated data to form the obfuscating key or a portion thereof (e.g., a first key portion) to generate a first key portion in block 1016. As an example, the obfuscating key may be a concatenation of two keys formed from the aforementioned process or another process. As such, the block cipher of the obfuscator 304 may be used to generate keys of various lengths. In one example, various orders of steps may be employed by the obfuscator 304 or controller 110 to generate the keys. As an example, the key seed may be used to obfuscate after the first number is used to obfuscate.

In block 1018, a second number is received. The second number may be generated by the random-number generator 536. Similar to the process for generating the first key portion described above, the first number may be replaced with a second number. The initialization vector may be obfuscated by the key seed, the results of which are obfuscated by the second number. As such, the results of obfuscating according to the second number may be further obfuscated by the hardware constant to calculate a second key portion in block 1020. The first key portion and the second key portion may be combined to define the obfuscating key.

In block 1022, the obfuscating key may be written to the revision-limited memory 114 and retrieved for use within the partition windows 502, 504, 506, 508, 510, 512, 514. A generic command that may be associated with the write operation may be translated into an access port command for writing the obfuscating key to the revision-limited memory 114. Derived obfuscating keys may be sent to other regions of the computer 102, for example, obfuscating keys that protect FLASH memory or SRAM of the computer 102.

In an example, a computer comprises a revision-limited memory having an interface and shim circuitry. The shim circuitry comprises inputs and outputs. The inputs are operable to receive a generic command. The shim is configured to communicate with the revision-limited memory over the interface based on the generic command. The outputs are operable to provide a response from the revision-limited memory based on the generic command.

CONCLUSION

Although implementations of techniques for, and apparatuses enabling, an interface for revision-limited memory have been described in language specific to features and/or methods, it is to be understood that the subject of the appended claims is not necessarily limited to the specific features or methods described. Rather, the specific features and methods are disclosed as example implementations enabling trusted computing for digital devices.

What is claimed is:

1. A method for interfacing with revision-limited memory, the method comprising:
    obtaining an access port command;
    instructing, based on the access port command, the revision-limited memory to execute a read operation or a write operation; and
    providing, based on execution of the read operation or the write operation by the revision-limited memory, an output comprising at least one of:
        an indication of a status of the read or write operation;
        revision-limited data from the revision-limited memory, the revision-limited data comprising at least one of information associated with a controller or user data stored in one or more partitions; or
        an indication of success of the read or write operation.

2. The method of claim 1, wherein obtaining the access port command comprises translating, prior to instructing the revision-limited memory, a generic command to the access port command.

3. The method of claim 2, wherein the generic command is indicative of the read operation or the write operation associated with the revision-limited memory, and wherein the access port command is sent with write data or read data indicative of the read operation or the write operation for the revision-limited memory.

4. The method of claim 3, wherein the read data or the write data is sized according to a bit width of obfuscating circuitry associated with the revision-limited memory.

5. The method of claim 1, further comprising:
    dividing the revision-limited data of the output into chunks.

6. The method of claim 5, wherein the revision-limited data is divided into chunks according to a bit width associated with obfuscating circuitry associated with the revision-limited memory.

7. The method of claim 6, further comprising:
    obfuscating the divided chunks; and
    transmitting the obfuscated divided chunks with the access port command.

8. The method of claim 5, wherein dividing the revision-limited data of the output into chunks is divided at an arbiter buffer.

9. The method of claim 8, further comprising:
    transmitting, responsive to dividing the revision-limited data at the arbiter buffer, the divided chunks of revision-limited data to an obfuscator.

10. The method of claim 9, wherein the obfuscator is configured to perform at least one of obfuscation, deobfuscation, scrambling, descrambling, encryption, decryption, or any combination thereof on the divided chunks.

11. The method of claim 9, wherein the obfuscator performs obfuscation of the divided chunks, and wherein the obfuscated chunks are transmitted to the revision-limited memory based on the access port command.

12. The method of claim 5, wherein, during a read operation, the chunks are transmitted to partition windows.

13. The method of claim 1, further comprising:
    determining that revision-limited data does not require obfuscation or deobfuscation; and
    transmitting revision-limited data directly between partition windows and partitions.

14. The method of claim 1, wherein the read or write operation is a built-in self-test of the revision-limited memory and the access port command defines the built-in self-test, the built-in self-test configured to scan a portion of the revision-limited memory for erroneous bits, and wherein the output comprises an error based on the built-in self-test.

15. The method of claim 1, wherein the access port command is indicative of a read operation, and wherein the access port command is sent with read data.

16. The method of claim 15, further comprising:
    sending a clock signal to the revision-limited memory based on two glitchless clock multiplexers; and
    driving, based on the clock signal, a primary clock.

17. The method of claim 16, wherein a controller includes the two glitchless clock multiplexers, and wherein the two glitchless clock multiplexers operate at different frequencies.

18. The method of claim 17, wherein a frequency of a first glitchless clock multiplexer of the two glitchless clock multiplexers operates at a frequency that is a multiple of a second first glitchless clock multiplexer of the two glitchless clock multiplexers, and wherein a selection bit may be propagated to select one of the clock signals to prevent glitches.

19. The method of claim 18, wherein the clock signals are encoded life-cycle broadcast signals, the clock signals including information related to a state of the revision-limited memory.

20. The method of claim 16, further comprising:
    determining that the primary clock is disconnected from the two glitchless clock multiplexers;
    disabling, based on the determination, the clock signal derived from the glitchless clock multiplexers based at least in part on data defined in a life-cycle partition of the revision-limited memory; and providing, responsive to the disablement or based on the determination that the primary clock is disconnected from the two glitchless clock multiplexers, a stable primary clock signal.

\* \* \* \* \*